(12) United States Patent
Oh et al.

(10) Patent No.: US 10,598,504 B2
(45) Date of Patent: Mar. 24, 2020

(54) VEHICLE CONTROL DEVICE AND VEHICLE COMPRISING THE SAME

(71) Applicant: LG Electronics Inc., Seoul (KR)

(72) Inventors: Jiwon Oh, Seoul (KR); Jinhua Piao, Seoul (KR); Eunjoung Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 37 days.

(21) Appl. No.: 15/826,382

(22) Filed: Nov. 29, 2017

(65) Prior Publication Data

US 2019/0094038 A1 Mar. 28, 2019

(30) Foreign Application Priority Data

Sep. 25, 2017 (KR) .................. 10-2017-0123685

(51) Int. Cl.
| | |
|---|---|
| *G01C 21/36* | (2006.01) |
| *B60R 16/037* | (2006.01) |
| *B60R 25/25* | (2013.01) |
| *B60K 35/00* | (2006.01) |
| *G05D 1/02* | (2006.01) |

(Continued)

(52) U.S. Cl.
CPC .......... *G01C 21/3608* (2013.01); *B60K 35/00* (2013.01); *B60R 16/0373* (2013.01); *B60R 25/257* (2013.01); *G05D 1/021* (2013.01); *G10L 15/22* (2013.01); *B60K 2370/148* (2019.05); *G06F 3/0484* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 5,774,858 A * | 6/1998 | Taubkin | B60R 25/257 704/270 |
| 6,292,782 B1 * | 9/2001 | Weideman | G06Q 20/425 704/273 |
| 9,071,367 B2 * | 6/2015 | Abhyanker | H04W 4/90 |

(Continued)

FOREIGN PATENT DOCUMENTS

| | | |
|---|---|---|
| JP | 2010074472 | 4/2010 |
| KR | 1020140067687 | 6/2014 |

(Continued)

OTHER PUBLICATIONS

Extended European Search Report in European Appln. No. 18192969.6, dated Mar. 14, 2019, 8 pages.

*Primary Examiner* — Jonathan C Kim
(74) *Attorney, Agent, or Firm* — Fish & Richardson P.C.

(57) ABSTRACT

The present disclosure relates to a vehicle control device for a vehicle having a voice input unit, an audio output unit, and a display. The vehicle control device may include a communication unit configured to communicate with at least one of the voice input unit, the audio output unit, and the display, and a processor configured to control the communication unit to output a message for inducing an utterance of a passenger aboard the vehicle in at least one of an auditory manner and a visual manner when a preset event occurs, and identify the passenger based on receiving a response of the passenger to the message through the voice input unit, and perform a different function based on the identified passenger.

17 Claims, 20 Drawing Sheets

(51) Int. Cl.
*G10L 15/22* (2006.01)
*G06F 3/0484* (2013.01)

(56) References Cited

U.S. PATENT DOCUMENTS

| | | | | |
|---|---|---|---|---|
| 9,205,805 B2* | 12/2015 | Cudak | ................... | B60K 35/00 |
| 9,665,101 B1* | 5/2017 | Templeton | ........... | G05D 1/0272 |
| 9,950,708 B1* | 4/2018 | Cullinane | ........... | B60W 30/095 |
| 9,963,106 B1* | 5/2018 | Ricci | ................... | B60R 25/2018 |
| 2012/0139760 A1* | 6/2012 | Bevacqua | ........ | B60R 25/102 |
| | | | | 340/989 |
| 2014/0306814 A1* | 10/2014 | Ricci | ................. | G01C 21/3484 |
| | | | | 340/425.5 |
| 2014/0309870 A1* | 10/2014 | Ricci | .................... | B60W 50/14 |
| | | | | 701/36 |
| 2015/0161836 A1* | 6/2015 | Park | .................. | G07C 9/00134 |
| | | | | 340/5.51 |
| 2015/0210287 A1* | 7/2015 | Penilla | ................. | B60W 40/08 |
| | | | | 701/49 |
| 2015/0233719 A1* | 8/2015 | Cudak | .................... | G01C 21/26 |
| | | | | 701/23 |
| 2015/0363986 A1* | 12/2015 | Hoyos | ................. | H05K 999/99 |
| | | | | 340/5.61 |
| 2015/0379987 A1* | 12/2015 | Panainte | ................. | H04R 1/08 |
| | | | | 704/246 |
| 2016/0023665 A1* | 1/2016 | Sherony | ................ | B60W 50/12 |
| | | | | 701/2 |
| 2016/0171521 A1* | 6/2016 | Ramirez | ............ | G06Q 30/0224 |
| | | | | 701/409 |
| 2016/0216130 A1* | 7/2016 | Abramson | ......... | G01C 21/3626 |
| 2016/0352712 A1* | 12/2016 | Tamp | ..................... | H04L 63/08 |
| 2017/0008490 A1* | 1/2017 | Sako | .................. | G07C 9/00571 |
| 2017/0116804 A1* | 4/2017 | Bae | ..................... | G07C 9/00896 |
| 2017/0186251 A1* | 6/2017 | Lee | .................... | G07C 9/00007 |
| 2017/0297588 A1* | 10/2017 | Doshi | .................... | B60W 50/14 |
| 2017/0323639 A1* | 11/2017 | Tzirkel-Hancock | ... | H04R 5/023 |
| 2018/0050664 A1* | 2/2018 | Tarte | ...................... | B60R 25/31 |
| 2018/0060253 A1* | 3/2018 | Gao | ...................... | G06F 13/102 |
| 2018/0144369 A1* | 5/2018 | Pouliot | ................ | B60W 40/09 |
| 2018/0286404 A1* | 10/2018 | Cech | ...................... | G10L 15/25 |
| 2019/0030987 A1* | 1/2019 | Li | ...................... | B60H 1/00657 |
| 2019/0049958 A1* | 2/2019 | Liu | .......................... | G01S 7/40 |
| 2019/0057703 A1* | 2/2019 | Zeinstra | ................ | G10L 15/30 |
| 2019/0073999 A1* | 3/2019 | Premont | ................ | G10L 15/32 |

FOREIGN PATENT DOCUMENTS

| | | |
|---|---|---|
| KR | 1020160124636 | 10/2016 |
| WO | WO2017034282 | 3/2017 |

* cited by examiner

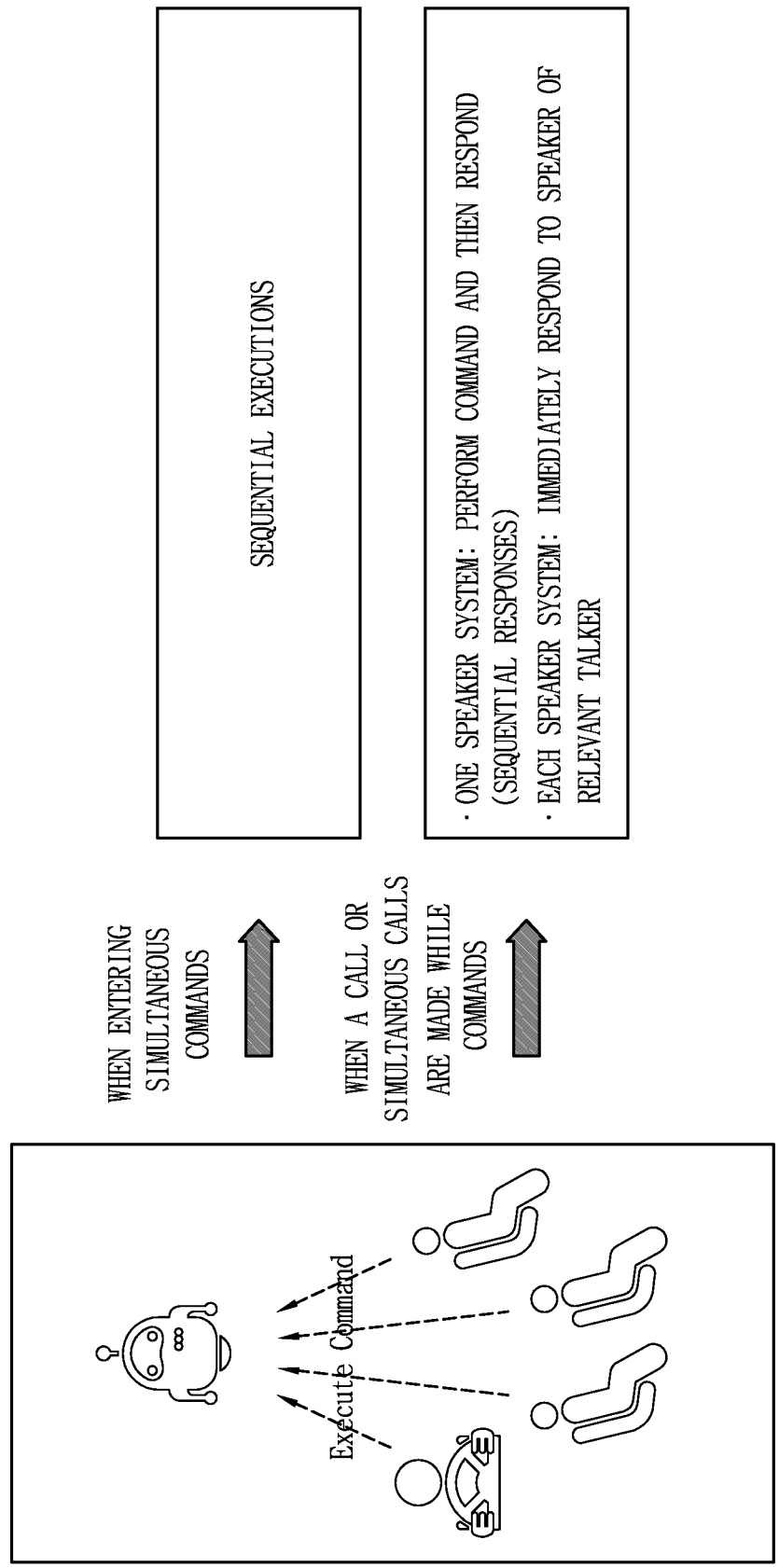

VEHICLE CONTROL DEVICE AND VEHICLE COMPRISING THE SAME

CROSS-REFERENCE TO RELATED APPLICATION

Pursuant to 35 U.S.C. § 119(a), this application claims the benefit of earlier filing date and right of priority to Korean Application No. 10-2017-0123685, filed on Sep. 25, 2017, the contents of which is incorporated by reference herein in its entirety.

BACKGROUND OF THE INVENTION

1. Field of the Invention

The present disclosure relates to a vehicle control device mounted on a vehicle to recognize a voice of a passenger boarding the vehicle, and a vehicle including the same.

2. Description of the Related Art

A vehicle means a transportation means capable of moving people or luggage using kinetic energy. Representative examples of vehicles include automobiles and motorcycles.

For safety and convenience of a user who uses the vehicle, various sensors and devices are provided in the vehicle, and the functions of the vehicle are diversified.

The functions of the vehicle can be divided into convenience functions for the convenience of a driver and safety functions for the safety of the driver and/or pedestrians.

First, the convenience functions has a motive for development related to the convenience of a driver, such as giving an infotainment (information+entertainment) function to the vehicle, supporting a partial autonomous driving function, or assisting in securing the driver's field of vision such as night vision or blind spot. For example, there are an active cruise control (ACC), a smart parking assist system (SPAS), a night vision (NV), a head up display (HUD), an around view monitor (AVM), and an adaptive headlight system (AHS).

The safety functions are technologies for securing the safety of a driver and/or pedestrians, including a lane departure warning system (LDWS), a lane keeping assist system (LKAS), an autonomous emergency braking (AEB) function, and the like.

Vehicles are provided with one or more displays for at least one passenger on board a vehicle, and as the functions of the vehicle become diversified, a variety of driving information is provided through displays. As a display changes from a device that simply transfers information to a device that communicates with a user, there is a need to develop a user interface that can control a display within a vehicle.

As a vehicle evolves from a simple mechanical device to an electronic device including various electronic devices, personal information that should be protected by law is being stored in the vehicle. Personal information is information on a living individual that can identify the individual and must be disclosed only to the information subject of personal information. Therefore, it is necessary for a vehicle to identify a passenger who boards the vehicle, and selectively provide only information corresponding to the passenger.

Moreover, in the case of a vehicle shared by various people, it is necessary to provide a function suitable for a person who uses the vehicle.

SUMMARY OF THE INVENTION

The objective of the present disclosure is to solve the above-mentioned problems and other problems.

An object of the present disclosure is to provide a vehicle control device capable of identifying a passenger using a voice of a passenger, and a vehicle including the same. More specifically, an object of the present disclosure is to provide a vehicle control device capable of providing an optimized user interface to a user simply by communicating with the user without passing through an additional authentication process, and a vehicle including the same.

An object of the present disclosure is to provide a vehicle control device capable of selectively providing personal information stored in a vehicle according to a passenger, and a vehicle including the same. Furthermore, an object of the present disclosure is to provide a vehicle control device that enhances security to allow only authorized persons to use the vehicle, and a vehicle including the same.

An object of the present disclosure is to provide a vehicle control device that allows a plurality of passengers to perform various functions in a vehicle using only voice, and a vehicle including the same.

The present disclosure relates to a vehicle control device for controlling one or more displays provided in a vehicle.

The vehicle control device may include a communication unit configured to perform communication with the one or more displays; and a processor configured to control the one or more displays using the communication unit to display a home button corresponding to an event when the event occurs, wherein the home button is configured to display a preset icon list in response to a touch applied to the home button, and the preset icon list varies according to the event.

According to an embodiment, the processor may control the communication unit such that, when a first event occurs, a first home button corresponding to the first event is displayed on a first display, and when the second event occurs, a second home button corresponding to the second event is displayed on the second display.

According to an embodiment, the event may be allowing a passenger to board the vehicle, and the preset icon list may vary according to at least one of the characteristics of the passenger and the boarding position of the passenger.

According to an embodiment, the processor may control the communication unit such that, when the passenger gets off the vehicle, the home button disappears.

According to an embodiment, the processor may receive an image from a camera that capture an inside of the vehicle, select any one of preset icon lists based on a passenger image included in the image, and set the selected icon list to the preset icon list for the home button.

According to an embodiment, the processor may select at least one display based on a position at which the passenger boards the vehicle, and control the communication unit to display the home button on the selected at least one display, and the selected at least one display may vary according to the event and the home button may not be displayed on the unselected remaining displays.

According to an embodiment, when first and second passengers board the vehicle, the processor may control the one or more displays to display a first home button corresponding to the first passenger and a second home button corresponding to the second passenger.

According to an embodiment, the first home button may be displayed on a first display to change a screen displayed on the first display, and the second home button may be displayed on a second display to change a screen displayed on the second display.

According to an embodiment, when the first and second home buttons are displayed on any one of the displays, the any one display may be divided into a first region that displays a first screen and a second region that displays a second screen.

According to an embodiment, the first home button may be configured to change the first screen of the first region, and the second home button may be configured to change the second screen of the second region.

According to an embodiment, when a drag input is applied to either one of the first and second home buttons, the either one may be moved according to the drag input, and the first and second regions may vary according to the position of the either one.

According to an embodiment, when the either one is located within a predetermined distance from the other one by the drag input, the processor may control the communication unit to allow the other one and the second screen to disappear and display the first screen in the first and second regions.

According to an embodiment, a boundary line separating the first and second regions may be displayed on the either one display, and the processor may adjust a size of at least one of the first and second regions based on a touch input applied to the boundary line, and change the display of at least one of the first and second home buttons according to the adjusted size.

According to an embodiment, the processor may control the communication unit such that at least one of the first and second home buttons disappears in response to a home button retrieval command.

According to an embodiment, when the passenger sits on a first seat, the home button may be displayed on a first display, and when the passenger sits on a second seat, the home button may be displayed on a second display.

According to an embodiment, the preset icon list may include a first icon configured to control an electrical product installed in the first seat or an adjacent region of the first seat, and when the passenger sits on a second seat, the preset icon list may include a second icon configured to control an electrical product installed in the second seat or an adjacent region of the second seat.

According to an embodiment, the processor may recognize a fingerprint from a touch input applied to the home button, and when the fingerprint is recognized while a first icon list is displayed on the home button, the setting of the home button may be changed to display a second icon list different from the first icon list.

According to an embodiment, when the fingerprint is recognized, the home button may be changed from a first shape to a second shape.

According to an embodiment, the processor may select a number of home buttons based on the event, and control the communication unit to display one or more home buttons corresponding to the selected number.

According to an embodiment, a pop-up window may be displayed when a preset condition is satisfied, and the processor may control the communication unit to display one or more pop-up windows corresponding to the selected number.

Furthermore, the present disclosure may be extended to a vehicle provided with the foregoing vehicle control device and/or a vehicle control method using the same.

The effects of a vehicle control device according to the present disclosure and a vehicle including the same will be described as follows.

A passenger may perform login to a system of the vehicle and receive a user interface customized for himself or herself even when the passenger naturally communicates with the virtual assistant without having to process an additional authentication procedure.

The vehicle control device may restrict function execution even when a person who is not authorized to operate the vehicle owns the smart key. In other words, the security of the vehicle may be upgraded one level since it is determined whether or not the user has genuine authority by voice recognition.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 19 is a conceptual view for explaining a control method when a plurality of voice commands are received within a predetermined time period.

DETAILED DESCRIPTION OF THE INVENTION

Figure 1:
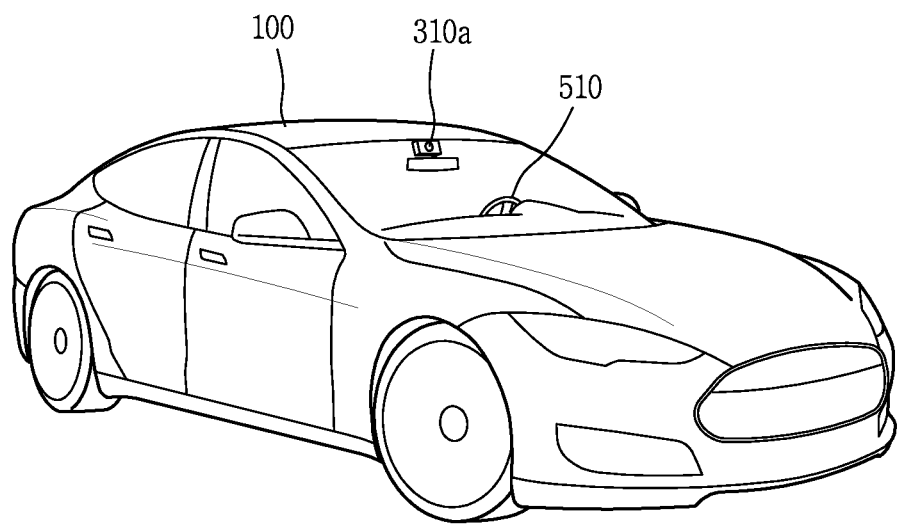
FIG. 1 is a view illustrating an appearance of a vehicle according to an embodiment of the present disclosure.
Figure 1:
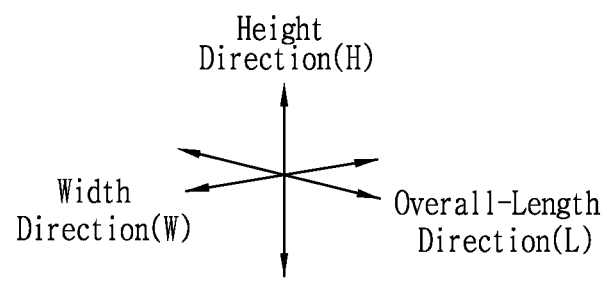

Hereinafter, preferred embodiments of the present disclosure will be described in detail with reference to the accompanying drawings, and the same or similar elements are designated with the same numeral references regardless of the numerals in the drawings and their redundant description will be omitted. A suffix "module" or "unit" used for constituent elements disclosed in the following description is merely intended for easy description of the specification, and the suffix itself does not give any special meaning or function. In describing the present disclosure, moreover, the detailed description will be omitted when a specific description for publicly known technologies to which the invention pertains is judged to obscure the gist of the present disclosure. The accompanying drawings are used to help easily understand the technical idea of the present disclosure and it should be understood that the idea of the present disclosure is not limited by the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation as far as it represents a definitely different meaning from the context.

Terms "include" or "has" used herein should be understood that they are intended to indicate the existence of a feature, a number, a step, a constituent element, a component or a combination thereof disclosed in the specification, and it may also be understood that the existence or additional possibility of one or more other features, numbers, steps, constituent elements, components or combinations thereof are not excluded in advance.

The vehicle described in this specification may be a concept including a car, a motorcycle. Hereinafter, the vehicle will be described based on a car.

The vehicle according to the embodiment of the present disclosure may be a conception including all of an internal combustion engine car having an engine as a power source, a hybrid vehicle having an engine and an electric motor as power sources, an electric vehicle having an electric motor as a power source, and the like.

In the following description, a left side of a vehicle refers to a left side in a driving direction of the vehicle, and a right side of the vehicle refers to a right side in the driving direction.

FIG. 1 is a view illustrating an appearance of a vehicle according to an embodiment of the present disclosure.

Figure 2:
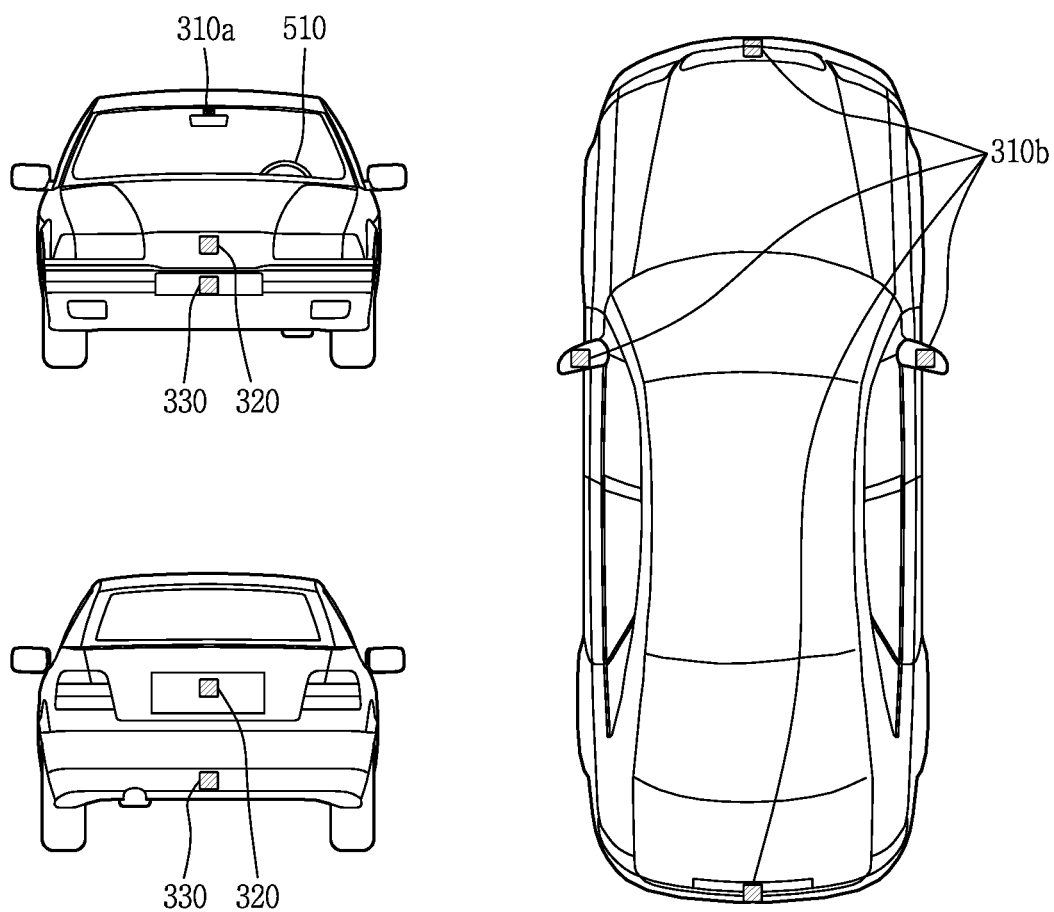
FIG. 2 is a view in which a vehicle according to an embodiment of the present disclosure is seen at various angles from the outside.

FIG. 2 is a view in which a vehicle according to an embodiment of the present disclosure is seen at various angles from the outside.

Figure 3:
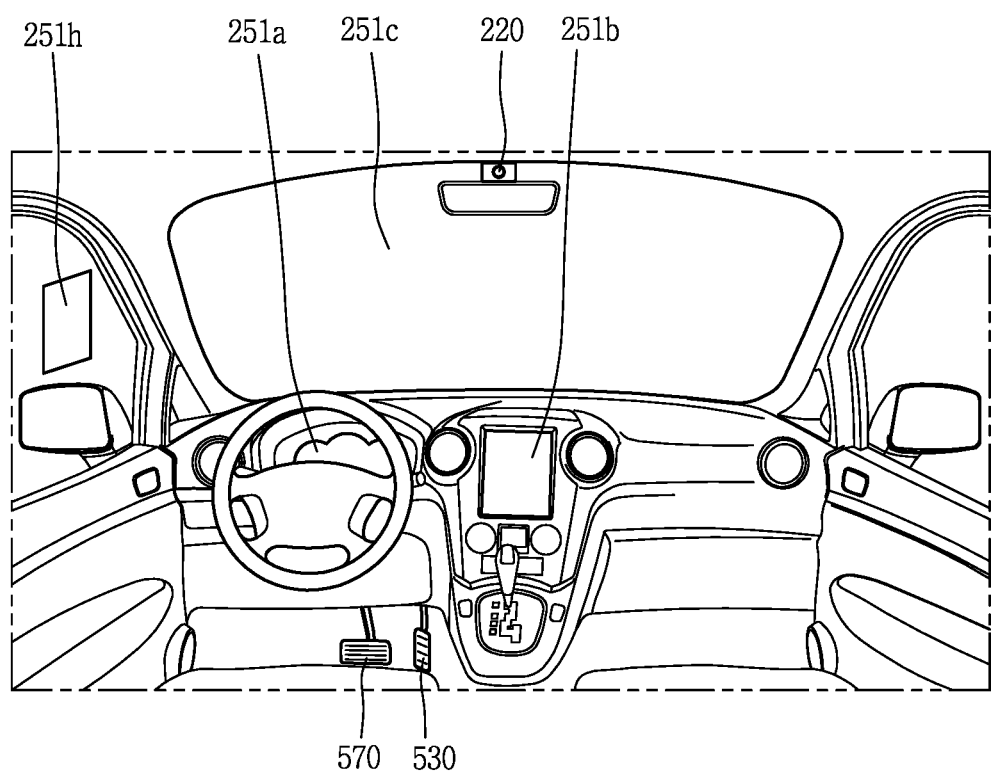
FIGS. 3 and 4 are views illustrating an inside of a vehicle according to an embodiment of the present disclosure.
Figure 4:
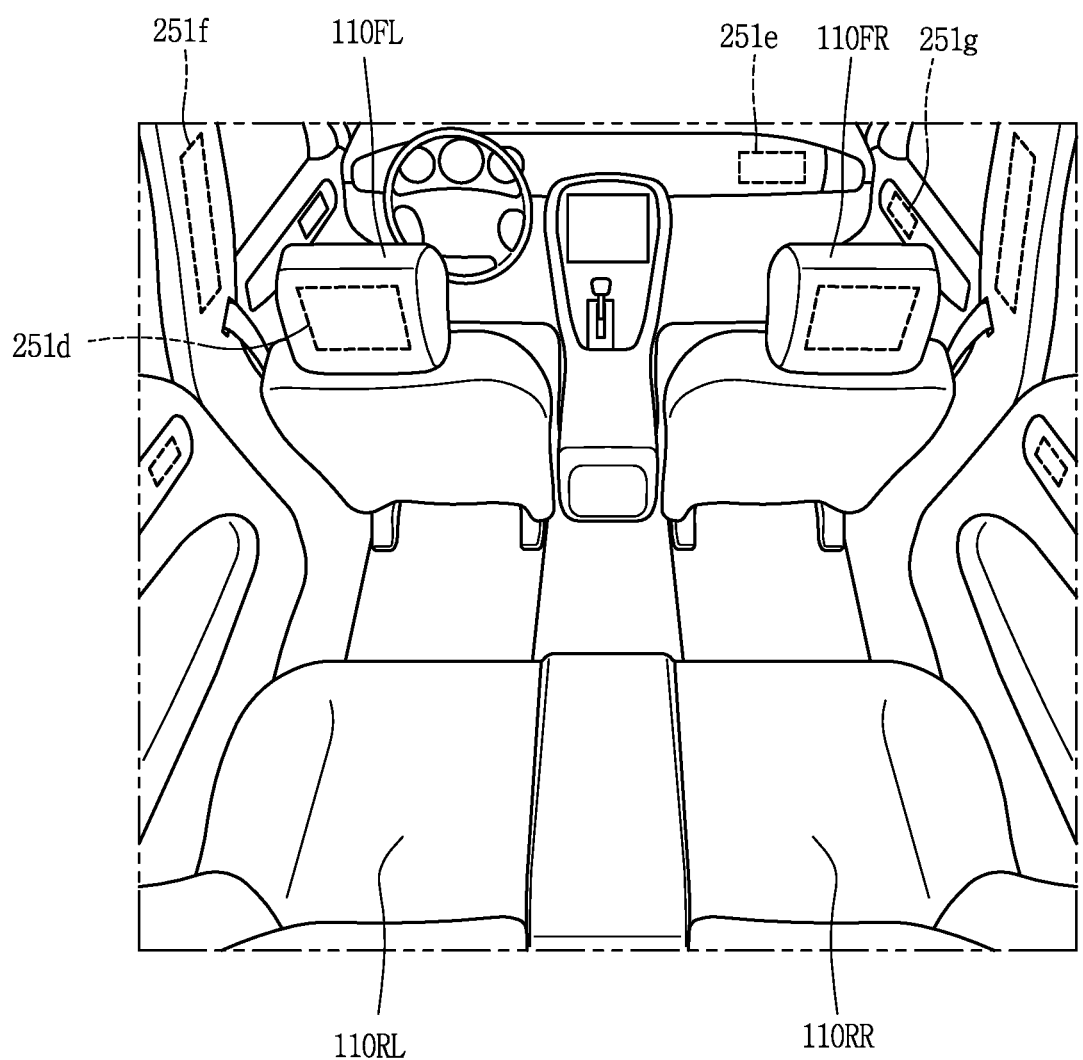

FIGS. 3 and 4 are views illustrating an inside of a vehicle according to an embodiment of the present disclosure.

Figure 5:
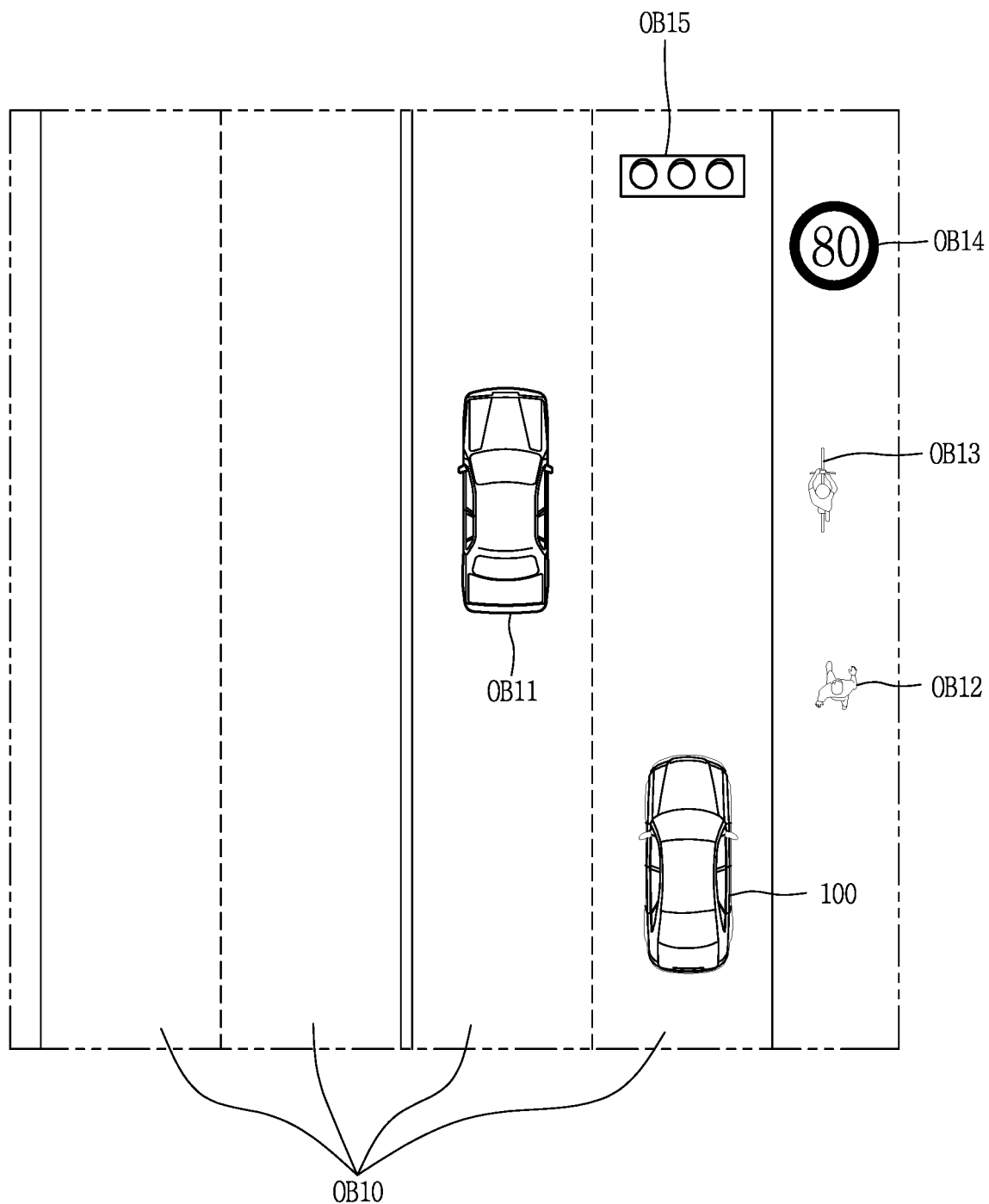
FIGS. 5 and 6 are views referred to explain an object according to an embodiment of the present disclosure.
Figure 6:
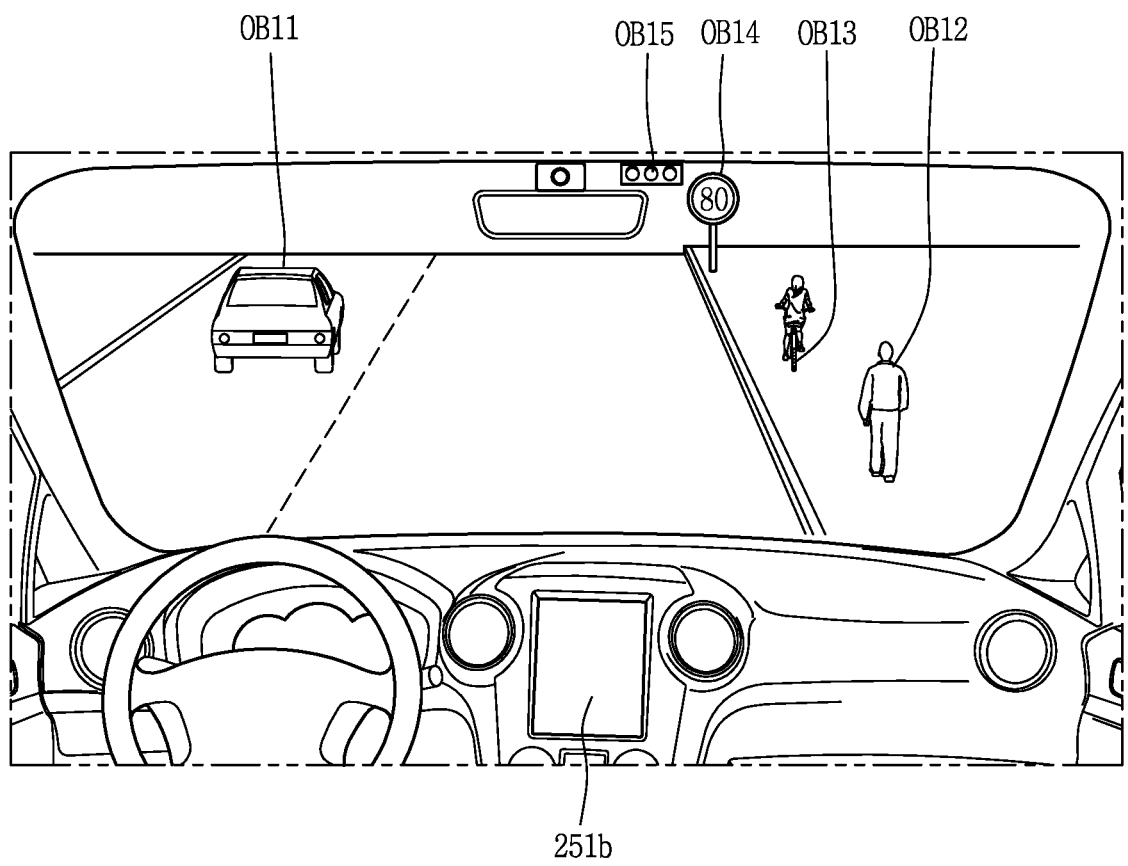

FIGS. 5 and 6 are views referred to explain an object according to an embodiment of the present disclosure.

Figure 7:
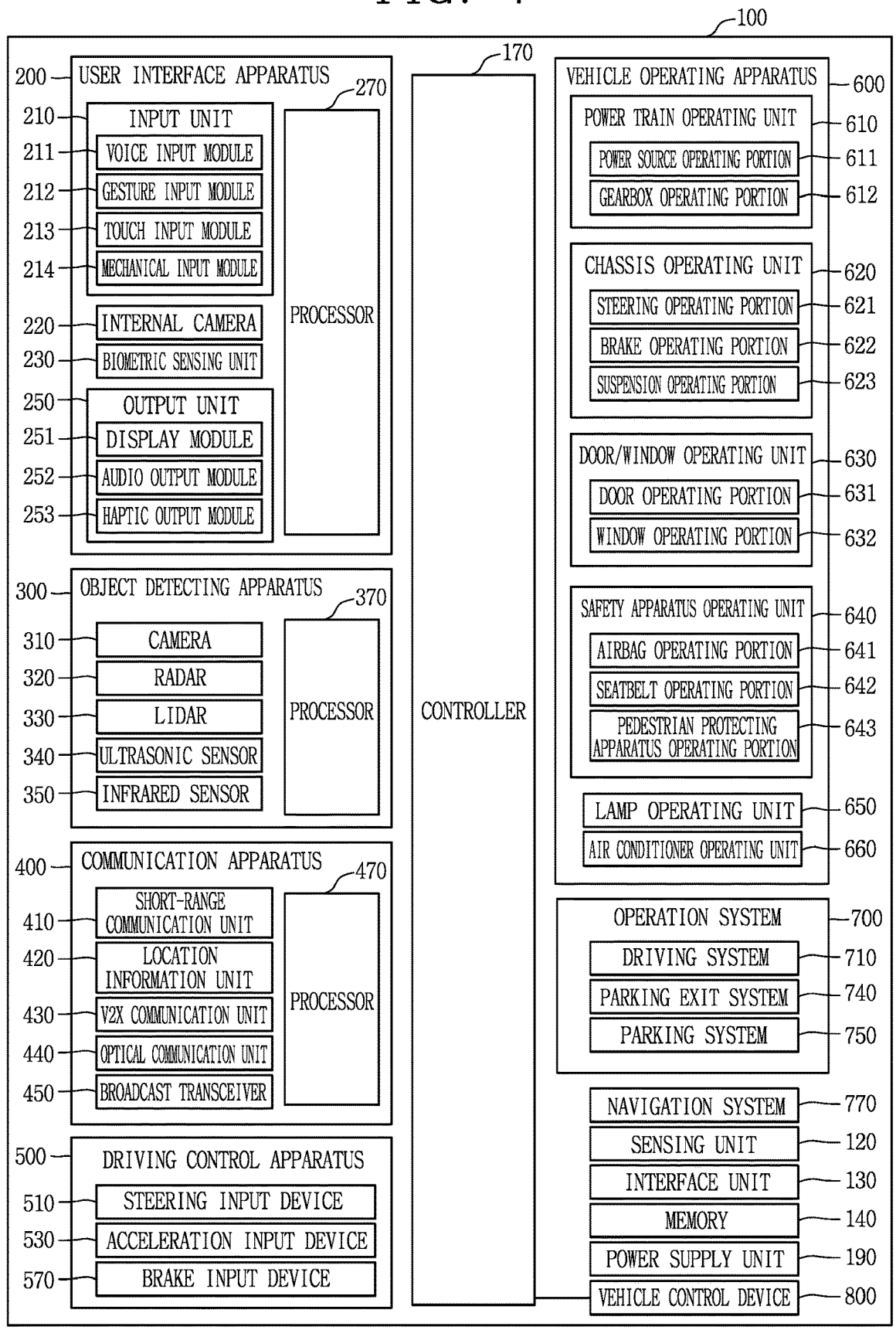
FIG. 7 is a block diagram for explaining a vehicle according to an embodiment of the present disclosure.

FIG. 7 is a block diagram for explaining a vehicle according to an embodiment of the present disclosure.

Referring to FIGS. 1 through 7, the vehicle 100 may include a wheel rotated by a power source, and a steering input device 510 for adjusting a traveling direction of the vehicle 100.

The vehicle 100 may be an autonomous driving vehicle.

Here, autonomous driving is defined as controlling at least one of acceleration, deceleration, and traveling direction based on a preset algorithm. In other words, the autonomous driving denotes automatically operating a driving operation device even when no user input is input to the driving operation device.

The vehicle 100 may be switched into an autonomous mode or a manual mode based on a user input.

For example, the vehicle may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous module into the manual mode based on driving environment information generated in the object detecting apparatus 300.

For example, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the autonomous vehicle 100 may be driven based on an operation system 700.

For example, the autonomous vehicle 100 may be driven based on information, data or signal generated in a driving system 710, a parking exit system 740 and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface apparatus 200, an object detecting apparatus 300, a communication apparatus 400, a driving control apparatus 500, a vehicle operating apparatus 600, a operation system 700, a navigation system 770, a sensing unit 120, an interface unit 130, a memory 140, a controller 170 and a power supply unit 190.

According to embodiments, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 200 may implement user interfaces (UIs) or user experiences (UXs) through the user interface apparatus 200.

The user interface apparatus 200 may include an input unit 210, an internal camera 220, a biometric sensing unit 230, an output unit 250 and a processor 270.

According to embodiments, the user interface apparatus 200 may include more components in addition to components to be explained in this specification or may not include some of those components to be explained in this specification.

The input unit 200 may allow the user to input information. Data collected in the input unit 200 may be analyzed by the processor 270 and processed as a user's control command.

The input unit 210 may be disposed within the vehicle. For example, the input unit 200 may be disposed on one area of a steering wheel, one area of an instrument panel, one area of a seat, one area of each pillar, one area of a door, one area of a center console, one area of a headlining, one area of a sun visor, one area of a wind shield, one area of a window or the like.

The input unit 210 may include a voice input module 211, a gesture input module 212, a touch input module 213, and a mechanical input module 214.

The voice input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

According to embodiments, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

According to an embodiment, the touch input module 213 may be integrated with the display unit 251 so as to implement a touch screen. The touch screen may provide an input interface and an output interface between the vehicle 100 and the user.

The mechanical input module 214 may include at least one of a button, a dome switch, a jog wheel, and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing module 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display module 251, an audio output module 252 and a haptic output module 253.

The display module 251 may output graphic objects corresponding to various types of information.

The display module 251 may include at least one of a liquid crystal display (LCD), a thin film transistor-liquid crystal display (TFT-LCD), an organic light emitting diode (OLED), a flexible display, a 3-dimensional (3D) display, and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a transparent TFEL (thin film electroluminescent), a transparent OLED (Organic Light-Emitting Diode), a transparent LCD (Liquid Crystal Display), a transmissive transparent display, and a transparent LED (Light Emitting Diode) in order to have transparency. The transparent display may have adjustable transparency.

Meanwhile, the user interface apparatus 200 may include a plurality of display modules 251a to 251g.

The display module 251 may be disposed on one area of a steering wheel, one area 521a, 251b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

According to an embodiment, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

Meanwhile, the user interface apparatus 200 may be called as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Referring to FIGS. 5 and 6, an object (O) may include a traffic lane OB10, another vehicle OB11, a pedestrian OB12, a two-wheeled vehicle OB13, traffic signals OB14 and OB15, light, a road, a structure, a speed hump, a geographical feature, an animal and the like.

The lane OB01 may be a driving lane, a lane next to the driving lane or a lane on which another vehicle comes in an opposite direction to the vehicle 100. The lanes OB10 may be a concept including left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB13 may refer to a vehicle (transportation facility) that is located near the vehicle 100 and moves using two wheels. The two-wheeled vehicle OB13 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The geographical feature may include a mountain, a hill and the like.

Meanwhile, objects may be classified into a moving object and a fixed object. For example, the moving object may be a concept including another vehicle and a pedestrian. The fixed object may be a concept including a traffic signal, a road and a structure.

The object detecting apparatus 300 may include a camera 310, a radar 320, a LiDAR 330, an ultrasonic sensor 340, an infrared sensor 350 and a processor 370.

According to an embodiment, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an AVM (Around View Monitoring) camera 310b, or a 360 degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented by a Frequency Modulated Continuous Wave (FMCW) scheme or a Frequency Shift Keying (FSK) scheme according to a signal waveform among continuous wave radar schemes.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a time of flight (TOF) manner or a phase-shift manner through a laser optical medium, and detect a position of the detected object, a distance from the detected object and a relative speed with the detected object.

The LiDAR 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 340 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor may detect an object based on reflected infrared light which emitted infrared light is reflected from the object, and track the object. The processor 370 may execute operations, such as a calculation of a distance from the object, a calculation of a relative speed with the object and the like, based on the infrared light.

According to an embodiment, the object detecting apparatus 300 may include a plurality of processors 370 or may not include any processor 370. For example, each of the camera 310, the radar 320, the LiDAR 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 300 may operate according to the control of the controller 170.

The communication apparatus 400 is an apparatus for performing communication with an external device. Here, the external device may be another vehicle, a mobile terminal or a server. The communication apparatus 400 may be referred to as a "wireless communication unit."

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

According to an embodiment, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an embodiment, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400.

According to an embodiment, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

Meanwhile, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. The steering input device 510 is preferably configured in the form of a wheel allowing a steering input in a rotating manner. According to some embodiments, the steering input device may also be configured in a shape of a touch screen, a touchpad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. According to some embodiments, the acceleration input device or the brake input device may also be configured in a shape of a touch screen, a touchpad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some embodiments, the vehicle operating apparatus 600 may further include other components in addition to the components described, or may not include some of the components described.

Meanwhile, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

Meanwhile, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The steering operating portion 621 may perform an electronic control for an steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

Meanwhile, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

Meanwhile, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate according to the control of the controller 170.

The operation system 700 is a system that controls various driving modes of the vehicle 100. The operating system 700 may be operated in an autonomous driving mode.

The operation system 700 may include a driving system 710, a parking exit system 740 and a parking system 750.

According to embodiments, the operation system 700 may further include other components in addition to components to be described, or may not include some of the components to be described.

Meanwhile, the operation system 700 may include a processor. Each unit of the operation system 700 may individually include a processor.

Meanwhile, according to embodiments, the operation system may be a sub concept of the controller 170 when it is implemented in a software configuration.

Meanwhile, according to embodiment, the operation system 700 may be a concept including at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and a processor. The memory may store the navigation information. The processor may control an operation of the navigation system 770.

According to embodiments, the navigation system 770 may update prestored information by receiving information from an external device through the communication apparatus 400.

According to embodiments, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

Meanwhile, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be various storage devices such as a ROM, a RAM, an EPROM, a flash drive, a hard drive, and the like in hardware. The memory 140 may store various data for overall operations of the vehicle 100, such as programs for processing or controlling the controller 170.

According to embodiments, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

Hereinafter, a vehicle control device 800 provided in the vehicle 100 will be described in detail.

The vehicle control device 800 may be provided in the vehicle 100, and configured with an independent device that can be detachable from the vehicle 100 or integrally installed in the vehicle 100 to be a partial component of the vehicle 100.

Hereinafter, for the sake of convenience of explanation, the vehicle control device 800 will be described as a separate component from the controller 170 of the vehicle 100. However, it is merely an embodiment of the present disclosure, and the operation and control method of all the display devices 800 described in this specification may be carried out by the controller 170 of the vehicle 100. In other words, the operation and/or control method performed by the processor 830 of the vehicle control device 800 may be performed by the controller 170 of the vehicle 800.

Figure 8:
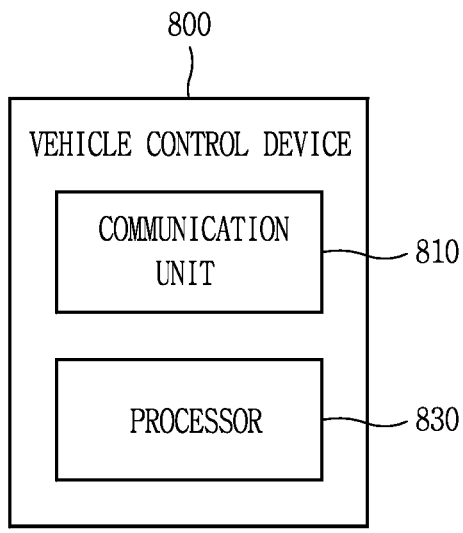
FIG. 8 is a conceptual view for explaining a vehicle control device according to an embodiment of the present disclosure.

FIG. 8 is a conceptual view for explaining a vehicle control device according to an embodiment of the present disclosure.

Referring to FIG. 8, the vehicle control device 800 includes a communication unit 810 and a processor 830.

The communication unit 810 is configured to perform communication with various components described in FIG. 7. For an example, the communication unit 810 may receive various information provided through a controller area network (CAN). In another example, the communication unit 810 may perform communication with all communicable devices such as a vehicle, a mobile terminal and a server, and another vehicle. It may be referred to as V2X (Vehicle to everything) communication. V2X communication may be defined as a technology that exchanges or shares information such as traffic situation while communicating with a road infrastructure and other vehicles while driving.

The communication unit 810 is configured to perform communication with one or more displays provided in the vehicle 100.

Moreover, the communication unit 810 may receive information related to the driving of the vehicle from most of devices provided in the vehicle 100. Information transmitted from the vehicle 100 to the display device 800 is referred to as "vehicle driving information".

The vehicle driving information includes vehicle information and surrounding information of the vehicle. Information related to an inside of the vehicle with respect to a frame of the vehicle 100 may be defined as vehicle information, and information related with an outside of the vehicle may be defined as surrounding information.

Vehicle information denotes information on the vehicle itself. For example, the vehicle information may include at least one of a driving speed, a driving direction, an acceleration, an angular speed, a position (GPS), a weight of the vehicle, a number of vehicle occupants, a braking force of the vehicle, a maximum braking force of the vehicle, an air pressure of each wheel, a centrifugal force applied to the vehicle, a driving mode of the vehicle (whether it is an autonomous driving mode or a manual driving mode), a parking mode of the vehicle (an autonomous parking mode, an automatic parking mode, a manual parking mode), whether or not a user boards the vehicle, information related to the user, and the like.

The surrounding information denotes information related to another object located within a predetermined range around the vehicle and information related to an outside of the vehicle. For example, the surrounding information may be, a state of a road surface (frictional force) while the vehicle is driving, weather, a distance from a front (or rear) vehicle, a relative speed of the front (or rear) vehicle, a curvature of a curve when a lane on which the vehicle is driving is a curve, a brightness around the vehicle, information related to an object existing in a reference region (predetermined region) based on the vehicle, whether an object enters or exits the predetermined region, whether a user exists around the vehicle, and information related to the user (e.g., whether or not the user is an authenticated user, etc.).

In addition, the surrounding information includes at least one of ambient brightness, a temperature, a position of the sun, information of an object located in the vicinity (a person, another vehicle, a sign, etc.), a type of driving road surface, a landmark, line information, driving lane information, and information required for an autonomous driving/autonomous parking/automatic parking/manual parking mode.

Furthermore, the surrounding information may further include a distance from an object existing around the vehicle to the vehicle 100, a possibility of collision, a type of the object, a parking space for the vehicle, an object for identifying the parking space (for example, a parking line, a string, another vehicle, a wall, etc.), and the like.

The vehicle driving information is not limited to the example described above and may include all information generated from the components provided in the vehicle 100.

Meanwhile, the processor 830 is configured to control one or more displays provided in the vehicle 100 using the communication unit 810.

Specifically, the processor 830 may determine whether or not at least one of a plurality of conditions, which are set in advance, is satisfied, based on the vehicle driving information received through the communication unit 810. Depending on the conditions that are satisfied, the processor 830 may control the one or more displays in different ways.

Regarding a preset condition, the processor 830 may sense the occurrence of an event in an electrical product and/or application provided in the vehicle 100, and determine whether the sensed event satisfies the preset condition. At this time, the processor 830 may also sense the occurrence of an event from information received through the communication unit 810.

The application is a concept including a widget, a home launcher, and the like, and refers to all types of programs that can be run on the terminal. Accordingly, the application may be a program that performs functions of a web browser, video playback, message transmission/reception, schedule management, and application update.

Moreover, the application may include at least one of a forward collision warning (FCW), a blind spot detection (BSD), a lane departure warning (LDW), a pedestrian detection (PD), a curve speed warning (CSW), and a turn-by-turn navigation (TBT).

For example, the occurrence of an event may include when there is a missed call, when there is an application to be updated, when a message arrives, start on, start off, autonomous travel on/off, an LCD awake key, an alarm, an incoming call, a missed notification, and the like.

For another example, the occurrence of an event may be an occurrence of an alert set by an advanced driver assistance system (ADAS), when a function set in ADAS is carried out, and the like. For example, it may be regarded that an event has occurred when a forward collision warning occurs, a blind spot detection occurs, a lane departure warning occurs, a lane keeping assist warning occurs, and when an autonomous emergency braking function is performed.

For still another example, it may be regarded that an event has occurred when changed from a forward gear to a reverse gear, when an acceleration greater than a predetermined value is generated, when a deceleration greater than a predetermined value is generated, when the power device is changed from an internal combustion engine to a motor, or when the power device is changed from a motor to an internal combustion engine.

In addition, it may be regarded that an event has occurred when various ECUs provided in the vehicle 100 perform specific functions.

When the generated event satisfies a preset condition, the processor 830 controls the communication unit 810 to display information corresponding to the satisfied condition is displayed on the one or more displays.

Hereinafter, the operation of the vehicle control device 800 will be described in more detail with reference to the accompanying drawings.

Figure 9:
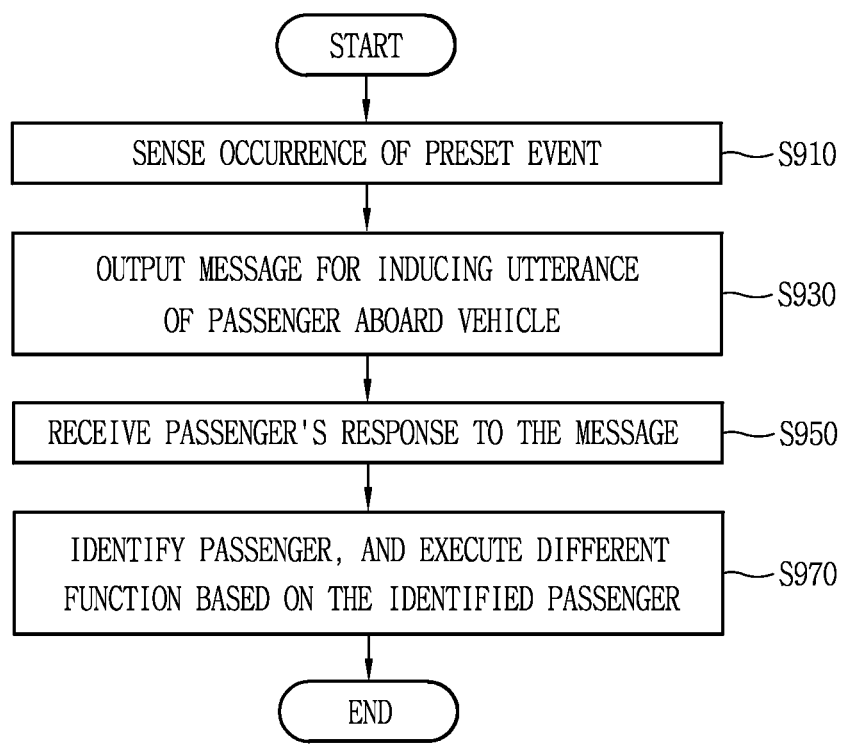
FIG. 9 is a flowchart for explaining a control method of the vehicle control device in FIG. 8.
Figure 10A:
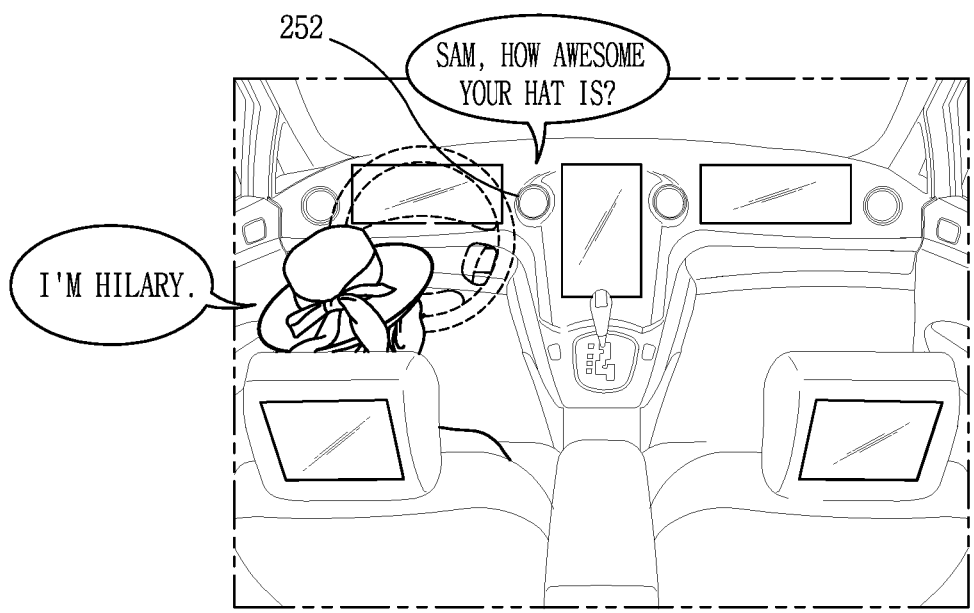
FIGS. 10A and 10B are exemplary views for explaining the control method in FIG. 9.
Figure 10A:
Figure 10A:
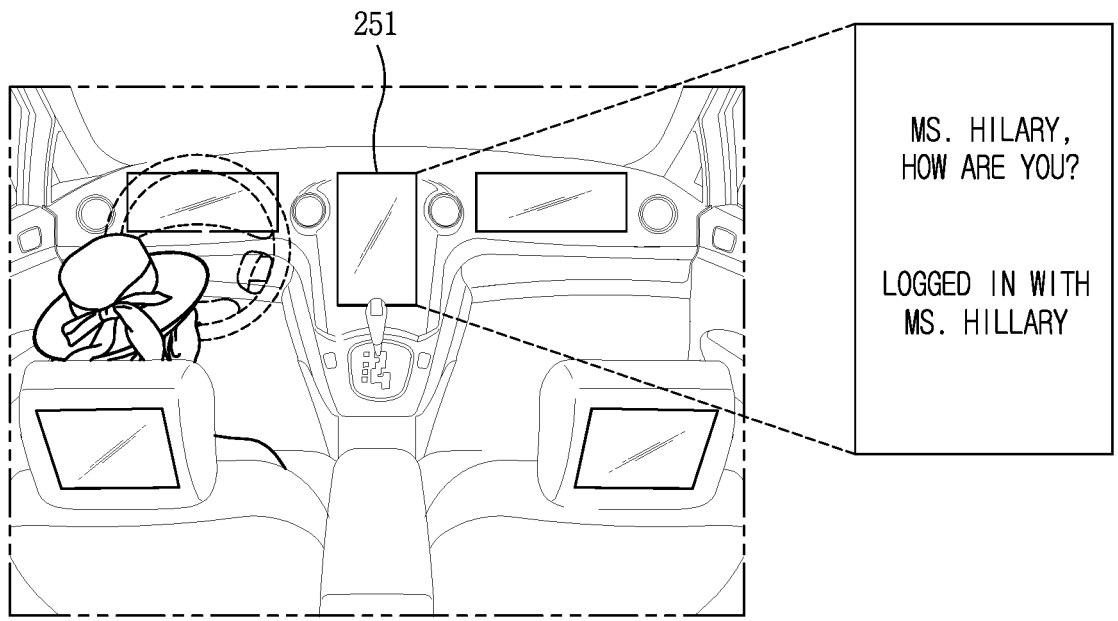
Figure 10B:
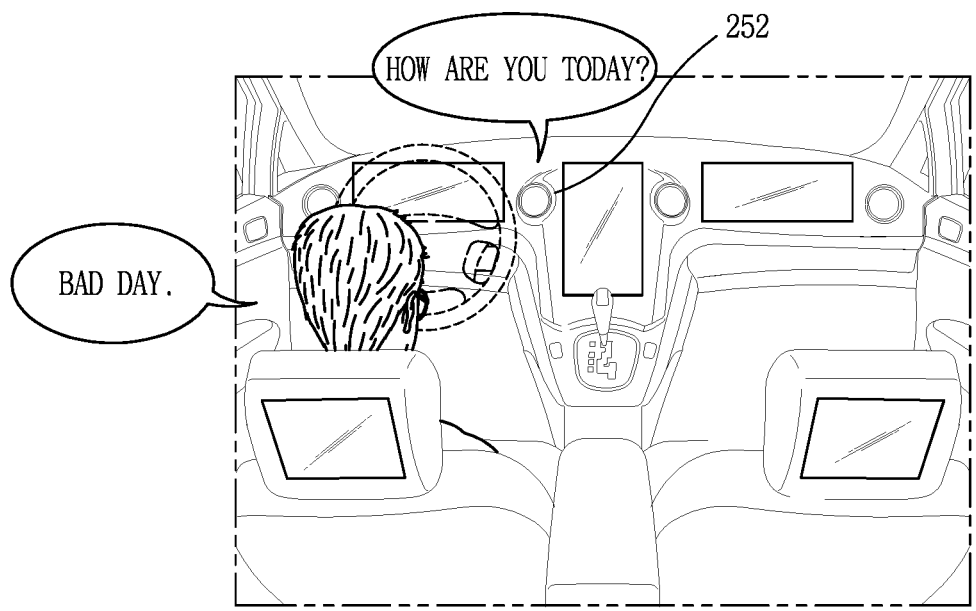
Figure 10B:
Figure 10B:
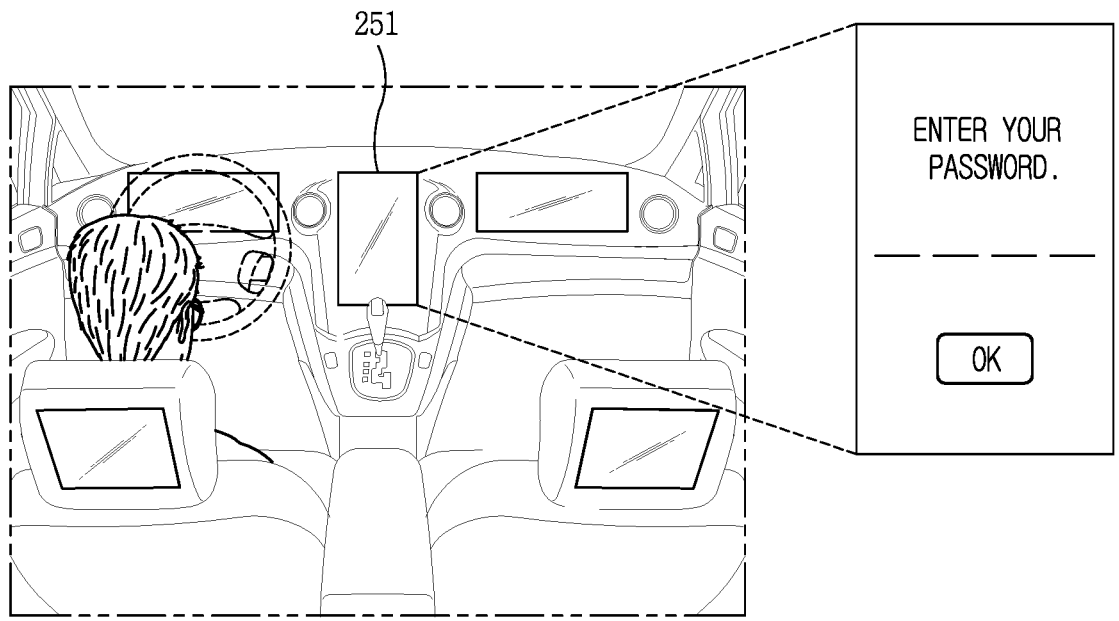

FIG. 9 is a flowchart for explaining a control method of the vehicle control device in FIG. 8, and FIGS. 10A and 10B are exemplary views for explaining the control method in FIG. 9.

First, the processor 830 senses the occurrence of a preset event (S910).

The processor 830 may sense the occurrence of the preset event based on the vehicle driving information received through the communication unit 810. Specifically, when the sensor provided on the vehicle senses the boarding of the passenger, the sensed information may be transmitted to the vehicle control device 800 through the communication unit 810. The processor 830 may determine whether or not the preset event is generated based on the sensed information.

The preset event denotes a condition set to grant authority required to use the vehicle to the passenger who boards the vehicle.

For example, the preset event may include at least one of when a passenger is boarding the vehicle, when a passenger sits on a seat of the vehicle, when a startup command is input to the vehicle, when the passenger speaks, when a driver is replaced, and when the passenger inputs a user input for requesting the execution of a preset function. For another example, it may be determined that the preset event has occurred whenever the vehicle enters a preset position, or at every preset time.

The preset event may be set in advance at the time of shipment of the vehicle control device or updated via the Internet after shipment.

When the preset event occurs, the processor 830 outputs a message for inducing an utterance of a passenger who boards the vehicle 100 (S930).

The processor 830 controls the communication unit 810 to output the message in at least one of an auditory manner and a visual manner. The message is output through the audio output module 252 when output in an audible manner, and output through the display unit 251 when output in a visual manner.

The message is preset in order to induce an utterance of a passenger who boards the vehicle 100, and denotes predetermined information in a language.

The processor 830 may perform the role of a virtual assistant using a voice recognition service.

The virtual assistant is an artificial intelligence platform including an interface for recognizing voice, text, images, and the like and a brain for processing the obtained data. The brain analyzes a situation perceived at an interface combined with engines such as natural language processing, search, and the like, and presents a result.

The message allows the passenger to naturally interact with the virtual assistant, which consists of a natural language. Moreover, the message may consist of a question sentence for which the passenger must answer.

The memory 140 may store a plurality of messages to be output when the preset event occurs. Moreover, the processor 830 may use deep learning to generate a message that is not stored in the memory 140 or update or delete a message stored in the memory 140.

The content of the message output by the preset event may vary according to the generated event. Specifically, a first message may be output when a first event occurs, and a second message may be output when a second event occurs.

In addition, the type of a language constituting the message may vary depending on the passenger. Specifically, the processor 830 may select any one of the messages, translate the selected message into a specific language based on the passenger, and output the translated message.

For example, a first message such as "Sam, how awesome your hat is." may be output when a first passenger gets on the vehicle, as illustrated in FIG. 10A, or a second message such as "How are you today?" may be output when a second passenger gets on the vehicle, as illustrated in FIG. 10B.

When a passenger gets on the vehicle, the processor 830 may receive an image from the camera that captures an inside of the vehicle 100, and analyze the received image to analyze the characteristics of the passenger. In addition, the processor 830 may select at least one of a plurality of messages stored in the memory based on the analyzed characteristics, and output the selected message.

The characteristics of the passenger may be analyzed by various algorithms such as weight information sensed by a weight sensor provided in a seat, fingerprint recognition, iris recognition, and face recognition.

Next, a response of the passenger to the message is received (S950).

The processor 830 may receive the response of the passenger to the message through the voice input module 211. A time period can be counted after the output of the message is completed, and when the response of the passenger is not received within a predetermined time period, the previously output message may be output again or a new message may be output.

The function execution of the vehicle may be restricted until the response of the passenger is received. For example, when the passenger inputs a user input for setting a destination in order to receive route guidance information, the message may be output. Despite the user input, the destination setting may be held without being made until a response to the message is generated.

When the passenger's response to the message is received, the processor 830 identifies the passenger and performs a different function based on the identified passenger (S970).

The response of the passenger is received from the voice input module 211 through the communication unit 810. The response of the passenger may be made up of natural language, and the processor 830 may extract the characteristics of a sound from the natural language using a voice recognition function, and identify the passenger based on the extracted characteristics. For example, at least one of a pitch, a loudness, a duration, and a timber may be extracted from the response of the passenger.

The processor 830 may determine whether or not the identified passenger corresponds to a previously stored user, and perform different functions accordingly.

For example, as illustrated in FIG. 10A, the processor 830 may receive "I'm Hilary" in a first response to the first message. The processor 830 may identify the passenger boarding the vehicle 100 from the first response as "Hillary." Since the "Hillary" corresponds to a user who has been stored, the processor 830 performs login with the "Hillary," and controls the communication unit 810 to display a home screen page set to the "Hillary."

On the contrary, as illustrated in FIG. 10B, the processor 830 may receive "bad day" in a second response to the second message. The processor 830 may determine from the second response that the passenger boarding the vehicle 100 is an unidentifiable (or anonymous) person. In other words, it may be determined that the user does not correspond to the previously stored user. In this case, the processor 830 may execute a locked state with a limited execution of functions to prevent personal information or applications stored in the vehicle 100 from being shared with the anonymous person. In the locked state, the display unit 251 may display a lock screen configured to receive a password.

The different functions will be described in detail with reference to FIG. 11.

Figure 11:
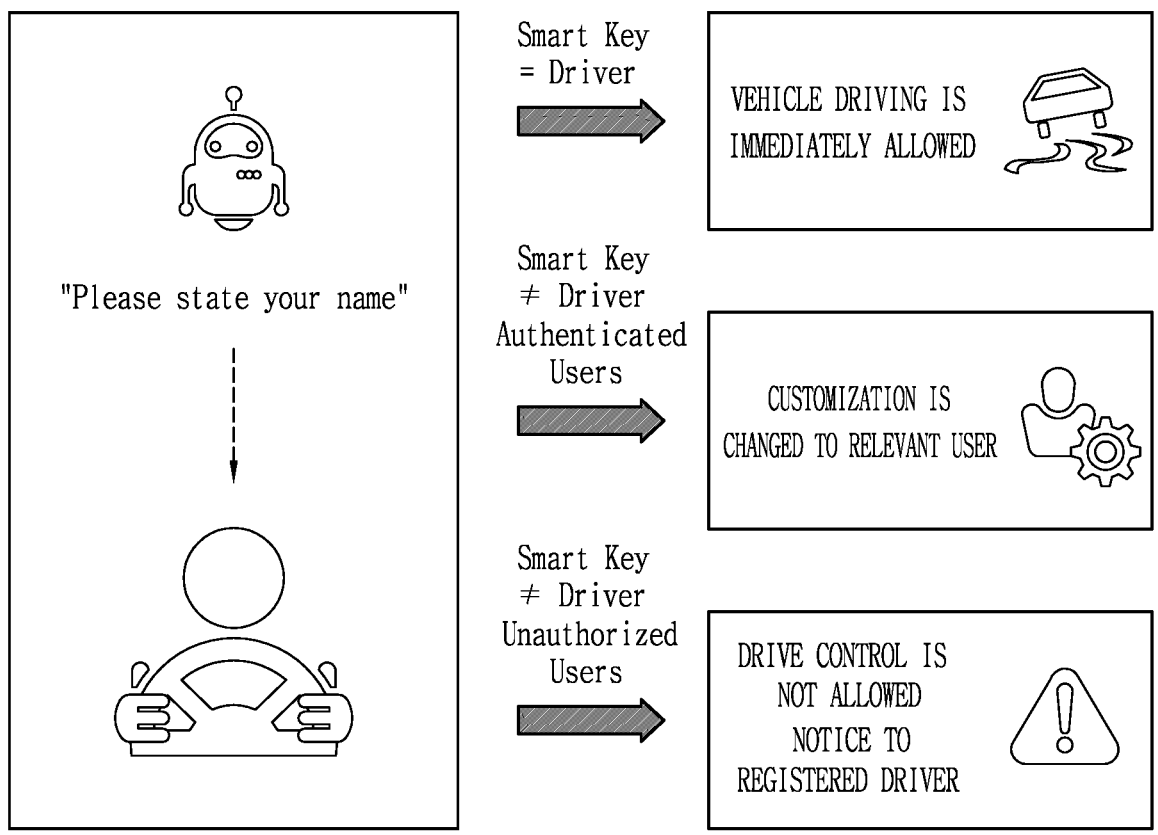
FIG. 11 is a conceptual view for explaining an operation of a vehicle control device according to a passenger identified by voice recognition.

FIG. 11 is a conceptual view for explaining an operation of a vehicle control device according to a passenger identified by voice recognition.

As illustrated in FIG. 11, the virtual assistant may be called when the driver turns on the vehicle. The virtual assistant may select at least one message to authenticate the driver, and output the selected message. When a response to the message is received, a passenger is identified, and different functions are carried out depending on the identified passenger.

For example, the virtual assistant may call the name of the previously stored user when the driver gets on the vehicle, or output a message to induce the driver's voice feedback, such as "please state your name."

A smart key is required for the vehicle 100 to be turned on. The smart key refers to a device that performs bidirectional communication with the vehicle 100, and the user may unlock the vehicle by merely possessing the smart key, and turn on the vehicle.

The user's information may be stored in the smart key. Through communication with the smart key, the processor 830 may determine whether or not the identified passenger corresponds to a user stored in the smart key.

When the user corresponds to a user stored in the smart key, the processor 830 may open all functions available to the vehicle to the identified passenger.

Although not stored in the smart key, information on a person who is authorized to be a driver of the vehicle 100 may be stored in the memory 140 of the vehicle.

For example, only husband information is stored in the smart key, and husband information and wife information may be stored in the memory 140 of the vehicle. When the wife turns on the vehicle while holding the smart key, the processor may determine that the wife is authorized to be a driver based on the wife information.

When the passenger corresponds to a user stored in the memory 140, the processor 830 may perform login as the user and provide a user interface set to the user.

Specifically, the processor 830 may grant different authorities according to the characteristics of the identified passengers. A number of executable applications may vary according to the granted authority.

For example, when the husband turns on the vehicle, the system is logged in with an ID of the husband, and a first home screen page set by the husband may be provided. At this time, only applications set or installed by the husband may be executed by the vehicle control device 800. On the contrary, when the wife turns of the vehicle, the system is logged in with an ID of the wife, and a second home screen page set by the wife may be provided.

Either one of the first and second home screen pages is output according to the identified passenger, wherein the icons included in the first home screen page and the icons included in the second home screen page are different. It is because different authorities are granted according to the identified passengers.

On the other hand, the identified passenger may correspond to the anonymous person or the response of the passenger may not be received through the voice input unit within a predetermined time from the time of outputting the message.

In this case, it may be possible to restrict the vehicle from being turned on, restrict access to personal information stored in the memory 140, restrict execution of at least one application or perform switching to a locked state requiring an input of password in an unlocked state.

In addition, the processor 830 may control the communication unit 810 to transmit a notification message to the prestored user's terminal. Since the vehicle 100 may be a stolen vehicle, the notification message may be transmitted to the prestored user's terminal, thereby notifying the state of the vehicle 100 to the prestored user as quickly as possible. The prestored user may confirm the state of the vehicle 100 using the notification message.

The terminal may provide a user interface capable of outputting the notification message as well as determining whether or not to release the locked state of the vehicle 100. The terminal may generate an unlock command for the vehicle 100 based on a user input.

The processor 830 may switch the locked state of the vehicle 100 to an unlocked state in response to receiving the unlock command from the terminal. The passenger who is not the prestored user may use the vehicle 100 according to the permission of the prestored user.

As described above, a passenger may perform login to a system of the vehicle 100 and receive a user interface customized for himself or herself even when the passenger naturally communicates with the virtual assistant without having to process an additional authentication procedure.

The vehicle control device 800 may restrict function execution even when a person who is not authorized to operate the vehicle owns the smart key. In other words, the security of the vehicle may be upgraded one level since it is determined whether or not the user has genuine authority by voice recognition.

Meanwhile, the processor 830 of the vehicle control device 800 according to the present disclosure may execute different functions according to the state of the vehicle 100 when the identified passenger does not correspond to the prestored user.

Figure 12:
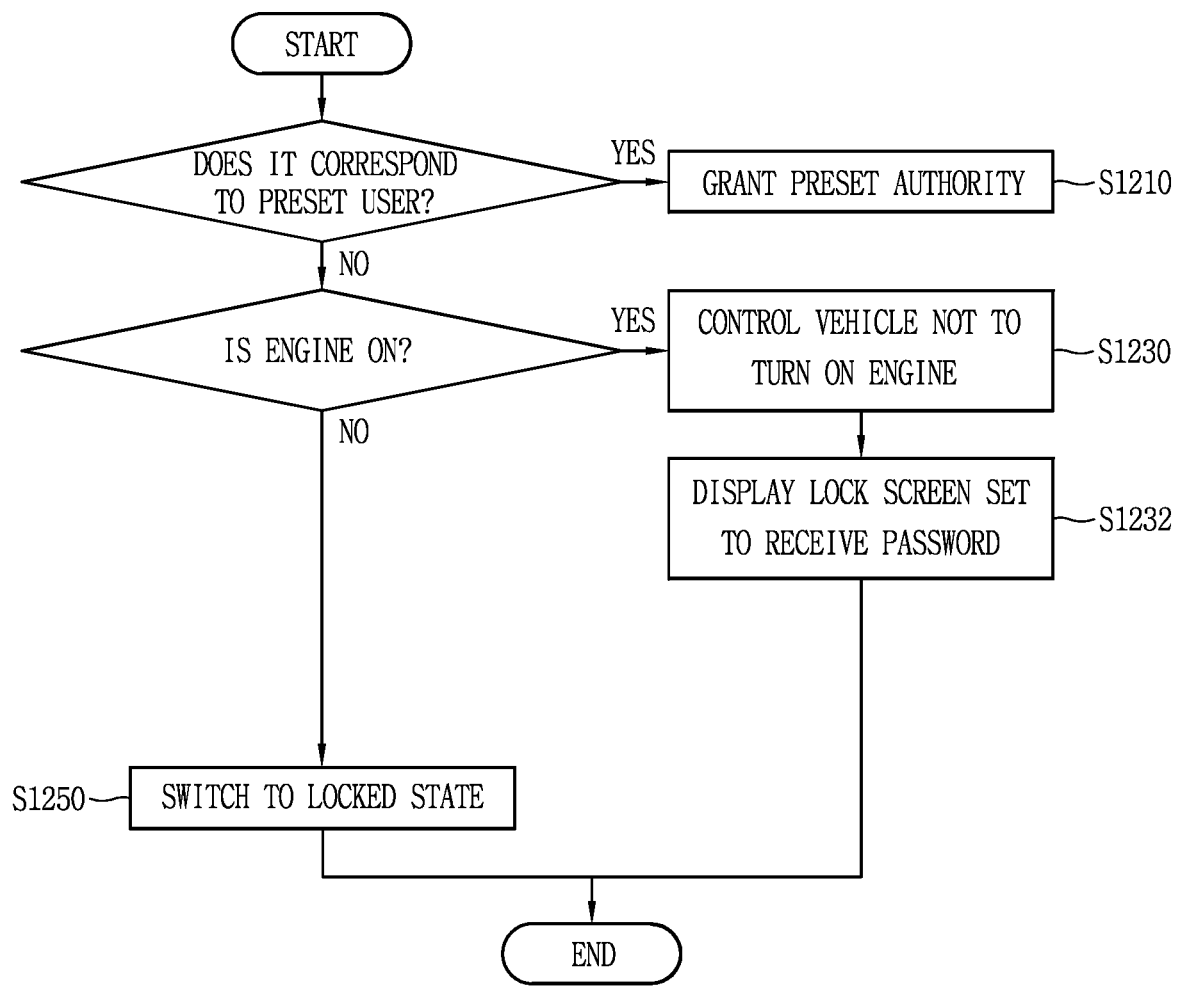
FIG. 12 is a flowchart for explaining a control method when the identified passenger does not correspond to a preset user.

FIG. 12 is a flowchart for explaining a control method when the identified passenger does not correspond to a preset user.

A method of executing different functions according to whether or not the identified passenger corresponds to a preset user is illustrated in FIG. 12.

When the passenger corresponds to the preset user, preset authority is granted (S1210). For example, when a first user and a second user are stored in the memory 140, a first right may be granted to the first user and a second right may be granted to the second user. If the customized authority is not stored separately, an authority set as a default option may be granted. A predetermined authority for a predetermined user may be added, updated or deleted by a user input.

When the passenger does not correspond to a predetermined user, different functions may be carried out depending on whether or not the startup of the vehicle 100 is turned on.

First, a case where the vehicle is off will be described.

When the identified passenger does not correspond to the prestored user and the startup of the vehicle is not turned on, the processor 830 controls the vehicle 100 not to turn on the startup of the vehicle even when a start command is input (S1230). In other words, it is basically blocked that the vehicle is turned on.

However, since there may be an error in a voice recognition function, the processor 830 controls the communication unit 830 to display a lock screen set to receive a password on the display unit 251 while controlling the vehicle 100 not to turn on the startup of the vehicle 100 (S1232).

The processor 830 may control the power supply unit 190 to supply power to the voice input module 211, the audio output module 252 and the display module 251 even when the vehicle is not turned on.

In order to efficiently use power, the processor 830 may control the communication unit to select at least one of a plurality of displays provided in the vehicle 100 based on a boarding position of the passenger, and display the lock screen only for the selected display. The unselected remaining displays will remain in an open state.

The passenger may be identified based on a response received from the passenger even when the vehicle is turned on. A passenger identification procedure using voice recognition may be carried out as long as a preset event is generated even when the vehicle is turned on.

The processor 830 may switch the vehicle to a locked state such that at least one of applications installed in the vehicle is not executed when the identified passenger does not correspond to the prestored user and the startup of the vehicle is turned on (S1250).

When all functions are restricted while the vehicle is turned on, an accident may occur. Accordingly, the processor 830 may limit some preset functions.

For example, a "home" or "company" may be set as a frequent destination for a navigation function. Since the destination corresponds to personal information, even when the navigation function is executed, a function of setting the destination as "home" or setting the destination as a "company" may not be executed.

Moreover, the processor 830 may control the communication unit 830 such that the speed of the vehicle 100 becomes lower than a reference speed in the locked state, thereby preventing the vehicle 100 from being stolen and operated. For example, the reference speed may be set to about 30 km/h, which is slower than a speed at which a person runs, so that the vehicle 100 cannot be fled.

When the vehicle 100 is allowed to perform autonomous driving, the processor 830 may control the communication unit 810 to allow the vehicle 100 to perform autonomous driving to a predetermined destination in the locked state, and turn off the startup of the vehicle 100 based on arriving at the predetermined destination. The predetermined destination may be a police station or a closest point where the vehicle 100 can park based on the position of the vehicle 100.

The driver's operation on the accelerator pedal or the steering wheel may be ignored while the autonomous driving is carried out. In other words, although the brake operates, no operation is carried out to change a steering direction or perform acceleration.

Since different functions are carried out according to the state of the vehicle 100 even though the passenger is not a preset user, the safety of passengers aboard the vehicle 100 is preferentially secured.

Figure 13:
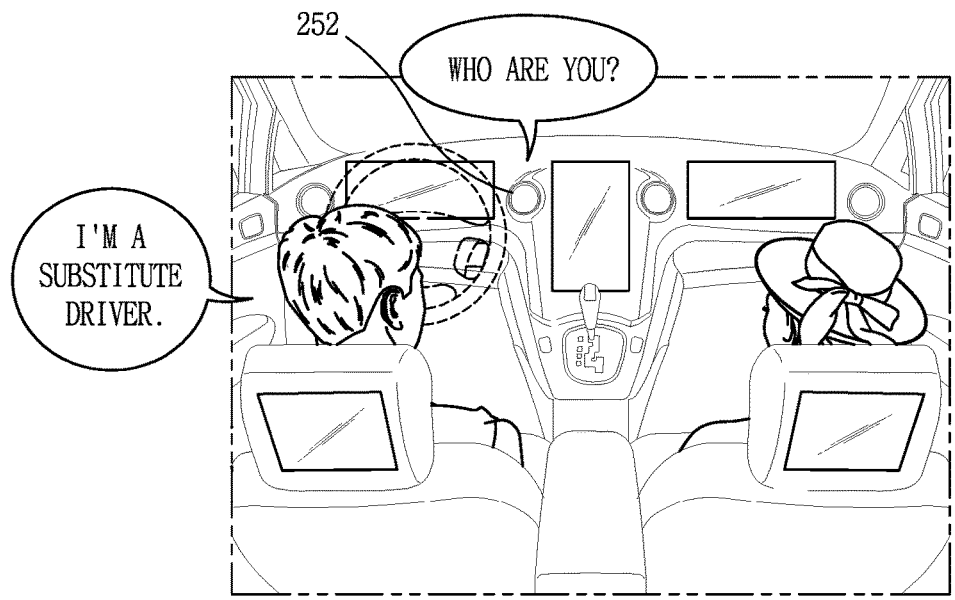
FIG. 13 is an exemplary view for explaining an operation of outputting an additional message to search for a preset user.
Figure 13:
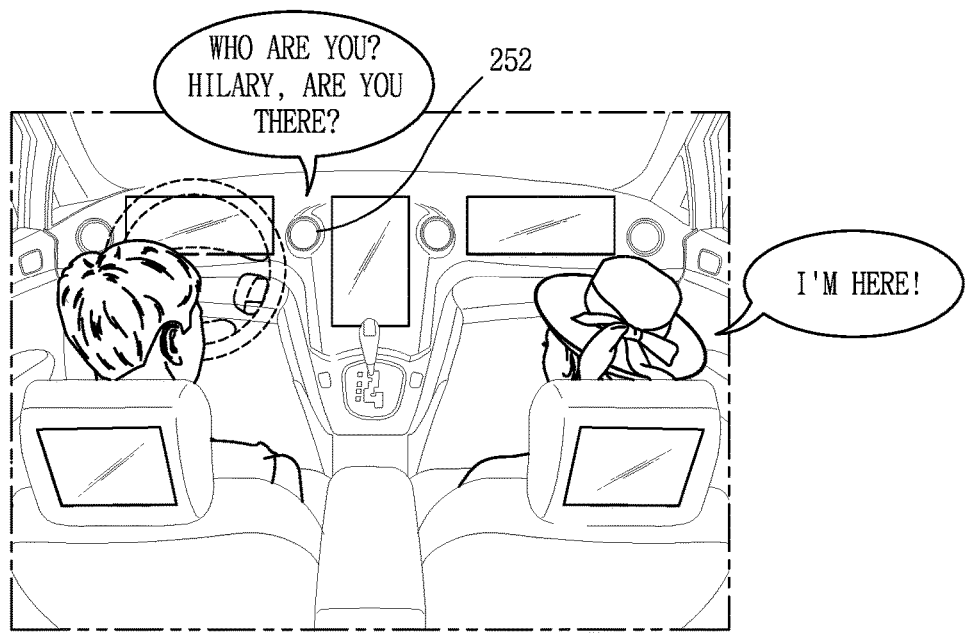

FIG. 13 is an exemplary view for explaining an operation of outputting an additional message to search for a preset user.

The user is unable to operate the vehicle 100 when a preset user of the vehicle 100 is under the influence of drink. In this case, the preset user may call a substitute driver to drive on his/her behalf. The substitute driver may be a problem because he or she is not the preset user.

The vehicle 100 may be boarded with an anonymous person. The processor 830 may select a message "Who are you?," and output the message.

The anonymous person may respond to the message "I'm a substitute driver." The processor 830 may perform speech recognition on the response to determine that the anonymous user does not correspond to the preset user.

In this case, the processor 830 may control the communication unit 810 to output additional messages for inducing an utterance of the previously stored user in at least one of an auditory manner and a visual manner.

Figure 14:
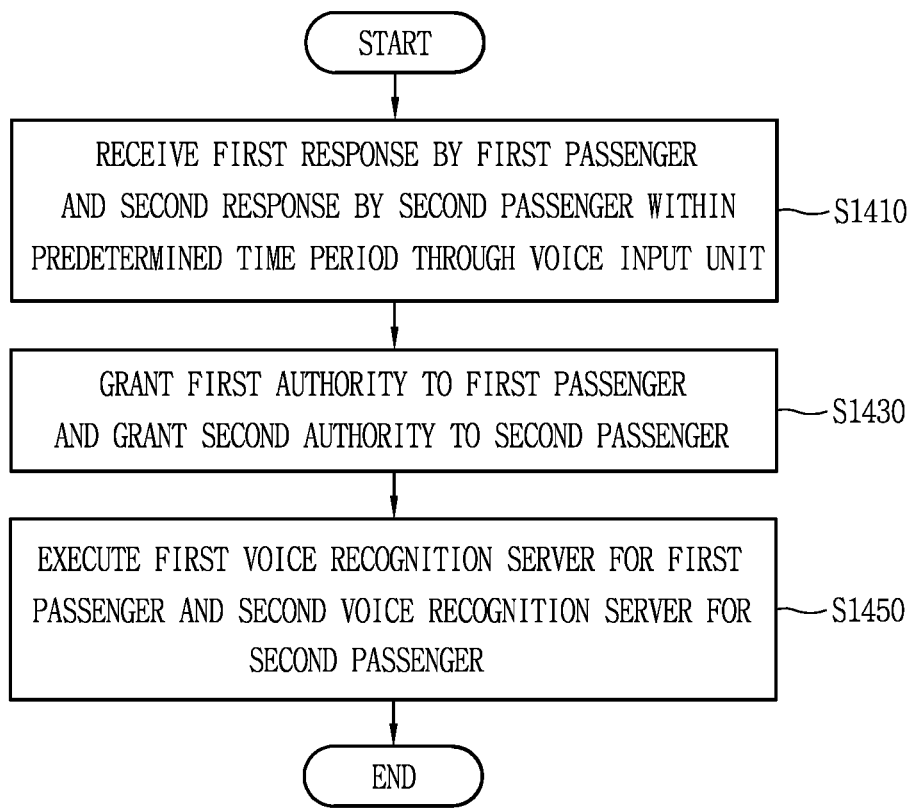
FIG. 14 is a conceptual view and flowchart for explaining a control method when a plurality of passengers are on board.

The additional message may include information on the prestored user. For example, as illustrated in FIG. 14, a name of the previously stored user may be included in the additional message. Since the additional message specifies a user to be authenticated, it may induce an utterance of the specified user.

When the preset user responds to the additional message, the vehicle 100 may switch a locked state of the vehicle to an unlocked state or grant an authority to operate the vehicle 100.

Referring again to FIG. 9, the processor 830 identifies the passengers based on the response of the passenger and performs a different function based on the identified passenger.

Up to now, an embodiment has been described in which a different authority is granted to the passenger with the different function.

Another example of the different function may be to perform a predetermined command included in the response of the passenger. In other words, various functions of the virtual assistant may be provided in response to the response of the passenger. Various voice recognition services provided by the virtual assistant will be described in detail with reference to the following drawings.

Figure 15:
FIGS. 15, 16A and 16B are exemplary views for explaining the control method in FIG. 14.
Figure 15:
Figure 15:
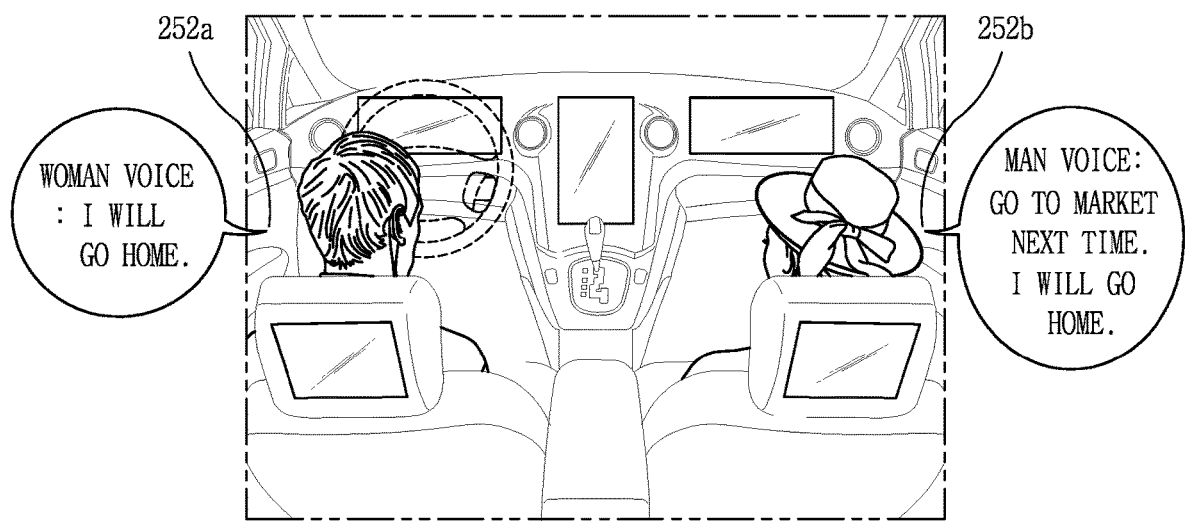
Figure 16A:
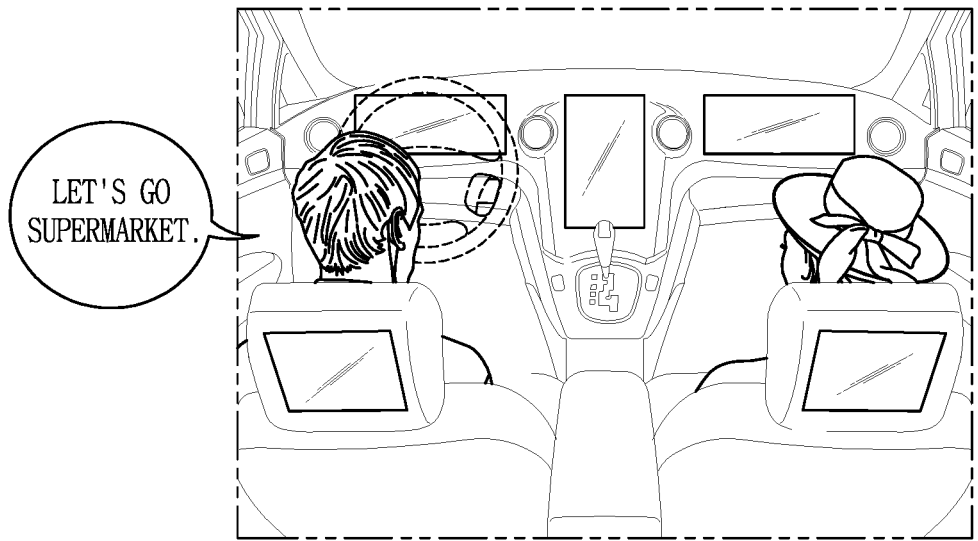
Figure 16A:
Figure 16A:
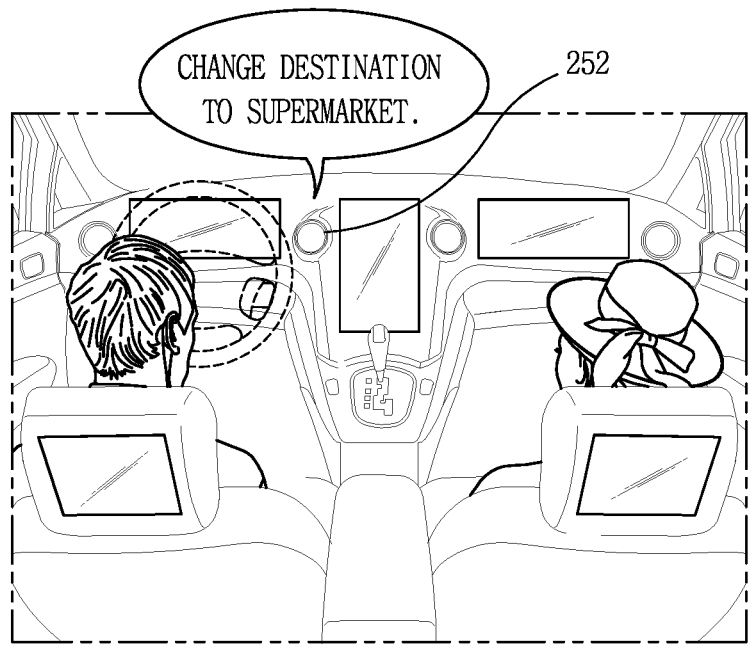
Figure 16B:
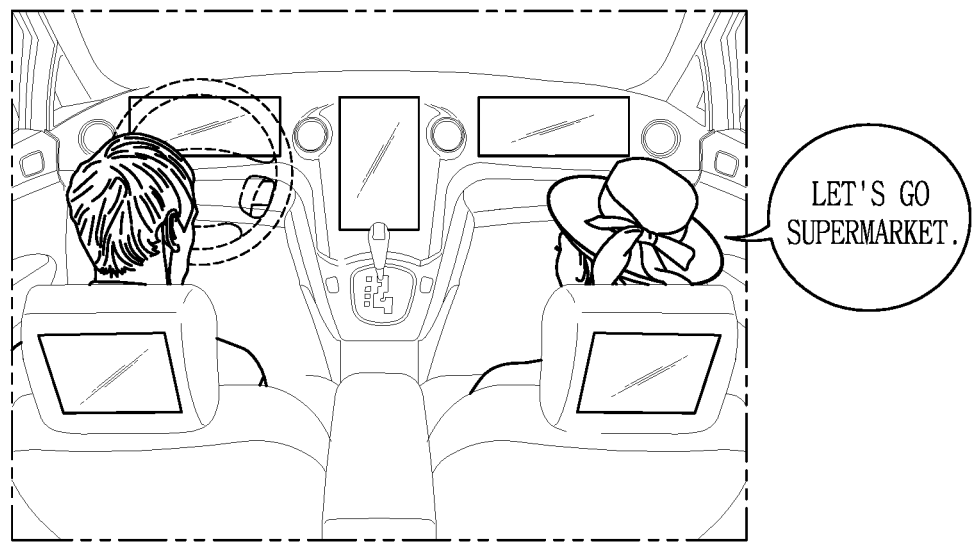
Figure 16B:
Figure 16B:
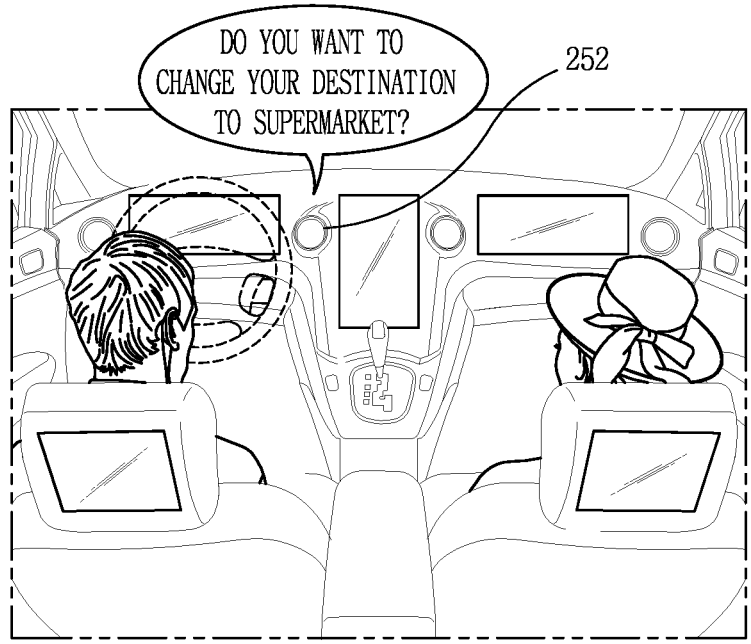

FIG. 14 is a conceptual view and flowchart for explaining a control method when a plurality of passengers are on board, and FIGS. 15, 16A and 16B are exemplary views for explaining the control method in FIG. 14.

In response to the message, a first response by a first passenger and a second response by a second passenger may be received through the voice input module 211 within a predetermined time period (S1410). In other words, a plurality of passengers may board the vehicle 100, and each passenger may perform a different response.

For example, as illustrated in FIG. 15, the processor 830 may output a message such as "Where do you want to go?" The first passenger performs a first response of "Let's go home", and the second passenger may perform a second response of "let's go to supermarket".

The processor 830 may identify the first passenger based on the first response and identify the second passenger based on the second response.

When neither the first passenger nor the second passenger is a preset user, the foregoing operation described in FIG. 12 is carried out.

When the first passenger is an anonymous person and the second passenger is a preset user, a first function corresponding to a voice command included in the first response may not be carried out but a second function corresponding to a voice command included in the second response may be carried out. For example, the destination of the vehicle 100 is set to "supermarket" by the first response, but not to "home."

When both the first passenger and the second passenger are preset users, the processor 830 may grant a first right to the first passenger and a second right to the second passenger (S1430).

When conflicting voice commands are input by the first and second passengers, priorities may be determined by the authority granted to each passenger. For example, when the first passenger inputs a first command to increase the speed of the vehicle 100 and the second passenger inputs a second command to decrease the speed of the vehicle 100, only a function corresponding to any one command may be carried out according to the authority granted to each passenger. Alternatively, the execution order of functions corresponding to the first and second commands may be changed according to the authority granted to each passenger.

For example, as illustrated in FIG. 16, when a first passenger is seated in the driver's seat and a second passenger is seated in the passenger seat, a higher level of authority may be granted to the first passenger seated in the driver's seat, and a lower level of authority may be granted to the second passenger seated in the passenger seat. Accordingly, the destination of the vehicle 100 may be set to "home" instead of "supermarket".

Next, the processor 830 may execute a first speech recognition service for the first passenger and a second speech recognition service for the second passenger (S1450).

Here, the voice recognition service may denote a virtual assistant. More specifically, the speech recognition service may be defined as a service for providing various information with voice to a specific passenger through a virtual assistant having predetermined tone, responding to a voice command of the specific passenger, and performing communication with the specific passenger.

Messages provided by the first voice recognition service may be output from a first audio output module corresponding to a position occupied by the first passenger, and messages provided by the second voice recognition service may be output from a second audio output module corresponding to a position occupied by the second passenger. Since different information is not output simultaneously from one speaker but individually to speakers corresponding to the respective passengers, a plurality of passengers may accurately listen to information provided to them.

Moreover, the processor 830 may control the communication unit 810 to output messages provided by the first voice recognition service in first tone and messages provided by the second voice recognition service in second tone. Since first information for the first passenger and second information for the second passenger are output with different tones, a plurality of passengers may more accurately listen to the information provided to them.

For example, as illustrated in FIG. 15, the processor 830 may set the destination to "home" rather than "supermarket" based on the rights granted to the first passenger and the second passenger. Since the first voice recognition service for the first passenger and the second voice recognition service for the second passenger are simultaneously carried out, different messages may be output from different audio output modules. Specifically, a first message "I will go home" may be output with a female voice from the first audio output module disposed adjacent to the driver's seat, and a second message "Go to market next time. I will go home." may be output with a male voice from the second audio output module disposed adjacent to the front passenger seat.

The first passenger may perform communication with the first voice recognition service, and the second passenger may perform communication with the second voice recognition service.

In recent years, as artificial intelligence technology emerges, various speech recognition services capable of performing communication through natural languages have been developed. For example, LG, Apple, Google, Amazon, Microsoft, Samsung, SK and Naver provide voice recognition services, such as q voice, siri, assistant, alexa, cortana, bixby, nugu, and clova, respectively.

The vehicle 100 may be provided with at least two voice recognition services among the voice recognition services described above. Furthermore, a user stored in the memory 140 may set a specific voice recognition service to be used by himself or herself. In other words, the type of voice recognition service may be customized.

With this customization, the processor 830 may selectively execute any one of the plurality of voice recognition services based on the identified passenger. In other words, the first speech recognition service provided to the first passenger and the second speech recognition service provided to the second passenger may be different types of voice services.

On the other hand, different functions may be carried out according to the authority set for each passenger.

When the second passenger requests a function out of the second authority while the first passenger granted with the first authority and the second passenger granted with the second authority are aboard the vehicle, the processor 830 may control the communication unit 810 to output a guidance message for guiding a request of the second passenger.

The driver may be granted unlimited authority. For example, as illustrated in FIG. 16A, when the first passenger corresponding to the driver inputs a voice command for requesting a destination change, the processor 830 may immediately change the destination of the vehicle 100 in response to the voice command.

On the contrary, a person who is not the driver is restricted from executing functions allowed only to the driver. For example, functions such as headlight on/off, start on/off, destination change, speed control, and brake control are allowed for the driver, but not for the passenger.

For example, as illustrated in FIG. 16B, when a second passenger who is not the driver inputs a voice command for requesting a destination change, the processor 830 restricts the execution of the function corresponding to the voice command. In other words, the voice command may be ignored.

However, the processor 830 may output a guidance message for guiding a request of the second passenger, thereby guiding the first passenger to have a request of the second passenger. For example, as illustrated in FIG. 16B, a message "Shall I change destination to supermarket?" may be output from the first audio output module by the first speech recognition service.

The processor 830 may determine whether or not to execute a function out of the second right based on whether a response message of the first passenger to the guidance message is received through the voice input module 211. For example, the function out of the second right is carried out when it is approved by the first passenger, but not carried out when rejected.

On the other hand, when an age of the passenger is younger than a reference age, right for a child may be granted to the relevant passenger. For example, when the right for a child is granted, a function to which a child lock is set, such as a function of opening or closing a door of the vehicle 100 or a function of adjusting a volume of the speaker may be restricted from being executed.

Depending on the characteristics of a passenger and/or a seat on which the passenger is seated, authority granted to the passenger may vary.

Figure 17:
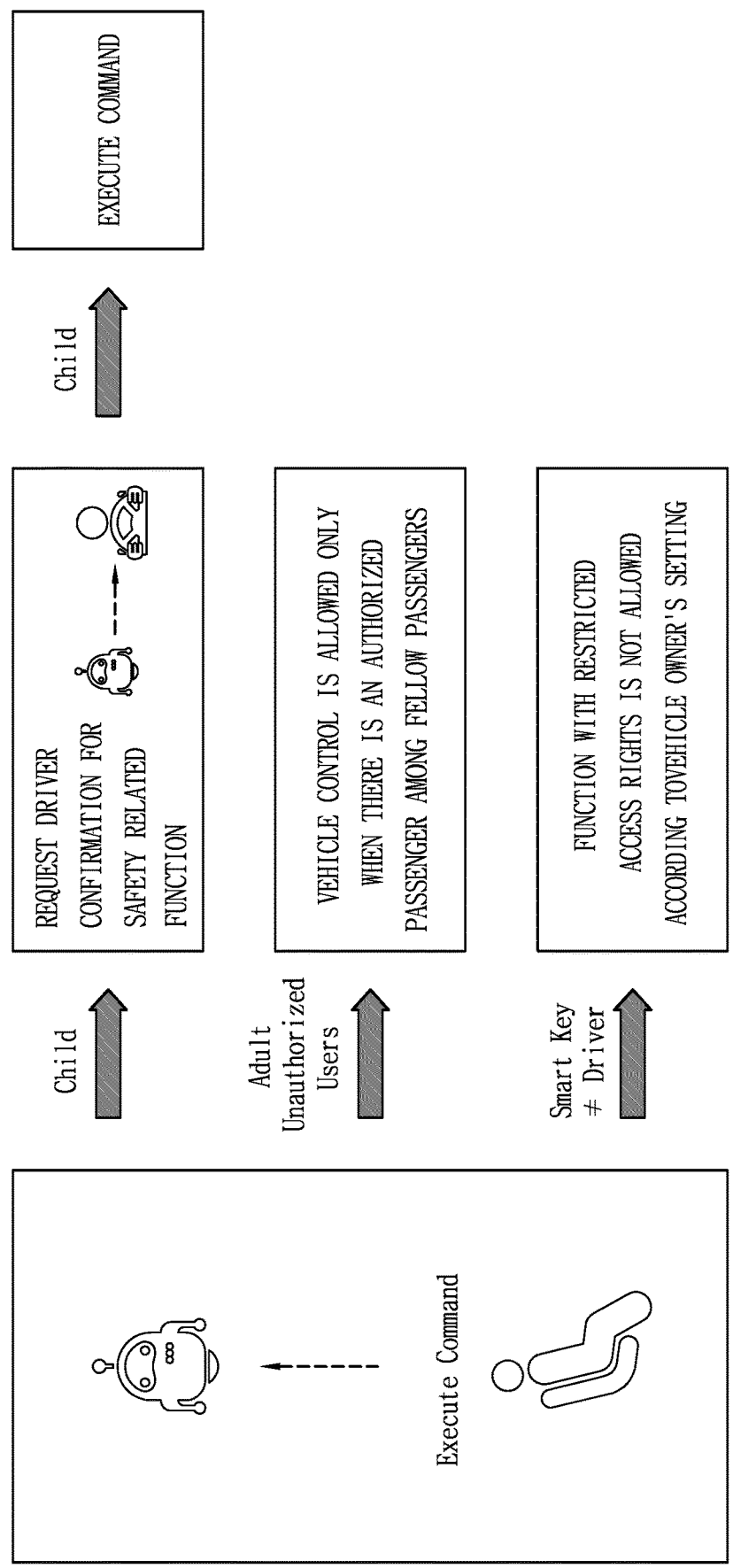
FIG. 17 is a conceptual view for explaining a method of providing a voice recognition service.

FIG. 17 is a conceptual view for explaining a method of providing a voice recognition service.

When a passenger who inputs a voice command is recognized as a child younger than the reference age, the right for the child is granted. Accordingly, the voice command input by the child may be restricted from being executed, but the processor 830 may output a guidance message to a person having authority (or the driver) to check whether or not to execute the function.

When the passenger who inputs a voice command is an adult but is not a prestored user, a function corresponding to the voice command may be carried out when at least one of passengers aboard the vehicle 100 is a prestored user. The execution of the function may be terminated at any time by the prestored user.

Figure 18:
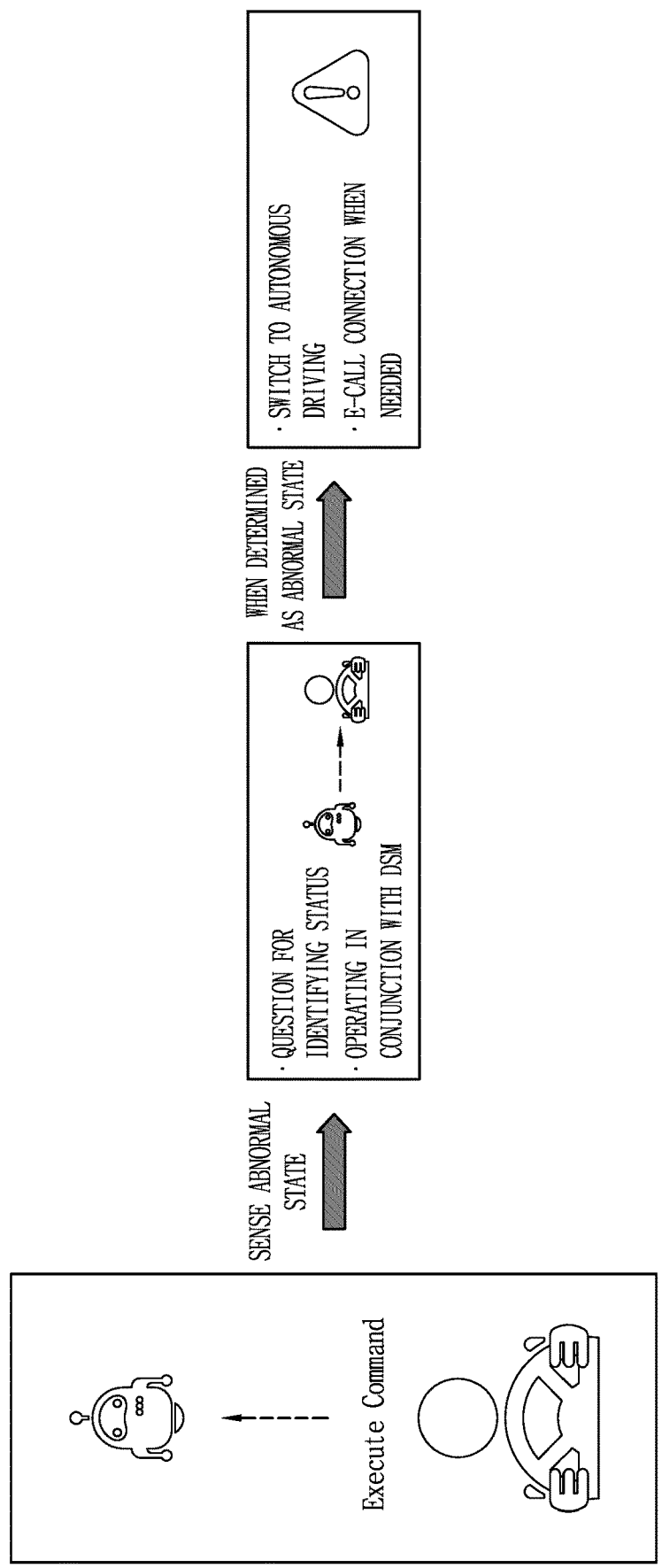
FIG. 18 is a conceptual view for explaining a control method when a driver's abnormal state is sensed.

FIG. 18 is a conceptual view for explaining a control method when a driver's abnormal state is sensed.

When a driver inputs a voice command, the processor 830 may analyze drowsiness, drinking or health status by analyzing acoustic characteristics.

Moreover, when it is estimated that there is a problem with the health condition of the driver, the processor 830 may ask a question that can determine the driver's condition. When an answer to the question is received through the voice input module 211, the received response may be analyzed to analyze the health status of the driver.

At this time, an image received from a camera that captures an inside of the vehicle 100 may also be used to analyze the driver's condition.

When it is determined that there is a problem with the health condition of the driver, the processor 830 may withdraw control of the vehicle 100 from the driver. More specifically, the processor 830 performs autonomous driving on the vehicle 100, and ignores an operation input to the driver.

Moreover, the processor 830 may connect a call to a preset contact, and allow the third party to obtain control of the vehicle 100. Alternatively, the processor 830 may notify a preset server that an emergency situation has occurred in the vehicle 100.

FIG. 19 is a conceptual view for explaining a control method when a plurality of voice commands are received within a predetermined time period.

A plurality of voice commands may be input to one voice recognition service almost at the same time. For example, a first passenger may input a first voice command, and at the same time a second passenger may input a second voice command. In this case, the processor 830 may sequentially execute the plurality of voice commands from a firstly input voice command.

When the second voice command of the second passenger is received while performing a first function according to the first voice command of the first passenger, the processor 830 may perform a second function according to the second voice command after the execution of the first function is completed. Alternatively, the processor 830 may perform the first and second functions at the same time, and output information on each of the first and second functions through different audio output modules at the same time.

On the other hand, the present disclosure may be extended to the vehicle 100 having the vehicle control device 800 described with reference to FIGS. 8 through 19.

The foregoing present disclosure may be implemented as codes (or an application or software) readable by a computer on a medium written by a program. The foregoing control method of an autonomous driving vehicle may be realized by codes stored in a memory or the like.

The computer-readable media includes all types of recording devices in which data readable by a computer system can be stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include the controller of the mobile terminal. The foregoing embodiments are merely exemplary and are not to be considered as limiting the present disclosure. The scope of the invention should be determined by reasonable interpretation of the appended claims and all changes that come within the equivalent scope of the invention are included in the scope of the invention.

What is claimed is:

1. A vehicle control device comprising:
   at least one processor;
   a communication device implemented by the at least one processor and configured to communicate with a voice input device, and at least one of an audio output device, or a display of the vehicle, wherein the voice input device comprises at least one microphone, and wherein the audio output device comprises a first speaker and a second speaker; and
   a computer-readable medium coupled to the at least one processor having stored thereon instructions which, when executed by the at least one processor, causes the at least one processor to perform operations comprising:
   determining that a preset event has occurred;
   based on the determination that the preset event has occurred, instructing the communication device to output a message configured to prompt a first vocal response from a first passenger in the vehicle, wherein the message is at least one of a visual type, an audible type, or a tactile type;

receiving, through the voice input device, the first vocal response from the first passenger in the vehicle;

in response to the received first vocal response, determining an identity of the first passenger; and performing a function associated with the vehicle in accordance with the identity of the first passenger, wherein the operations further comprise:

receiving, through the voice input device, a second vocal response from a second passenger of the vehicle, the second vocal response including a request for execution of a function associated with the vehicle;

in response to the received second vocal response, determining an identity of the second passenger and authority of the second passenger to execute applications installed on the vehicle in accordance with one or more characteristics associated with the second passenger;

based on the identity of the first passenger, executing a first voice recognition service associated with the first passenger;

based on the identity of the second passenger, executing a second voice recognition service associated with the second passenger, determining the first speaker of the audio output device corresponding to a position of the first passenger;

determining, by the first voice recognition service, first audible messages for the first passenger;

instructing the communication device to output the first audible messages through the first speaker;

determining the second speaker of the audio output device corresponding to a position of the second passenger;

determining, by the second voice recognition service, second audible messages for the second passenger;

instructing the communication device to output the second audible messages through the second speaker;

determining that the function requested for execution by the second passenger is not allowed under the authority of the second passenger; and based on the determination that the function requested by the second passenger is not allowed under the authority of the second passenger, instructing the communication device to output a guidance message requesting an approval for execution of the function from the first passenger through the first speaker.

2. The vehicle control device of claim 1, wherein the operations comprise:

determining, by the first voice recognition service, first audible messages for the first passenger;

instructing the communication device to output the first audible messages in a first tone;

determining, by the second voice recognition service, second audible messages for the second passenger; and instructing the communication device to output the second audible messages in a second tone different from the first tone.

3. The vehicle control device of claim 1, wherein the first and second voice recognition services are different types of voice recognition services.

4. The vehicle control device of claim 1, wherein the operations comprise:

based on the determined identity of the first passenger, selecting, from a plurality of voice recognition services, a first voice recognition service associated with the first passenger; and based on the selection, executing the first voice recognition service associated with the first passenger.

5. The vehicle control device of claim 1, wherein the operations comprise:

determining one or more characteristics associated with the first passenger;

determining authority of the first passenger to execute applications installed on the vehicle in accordance with the one or more characteristics associated with the first passenger; and allowing the first passenger to execute applications installed on the vehicle in accordance with the determined authority of the first passenger.

6. The vehicle control device of claim 1, wherein the operations comprise:

receiving, through the voice input device, a third vocal response from the first passenger approving execution of the function requested by the second passenger; and in response to receiving the third vocal response from the first passenger approving execution of the function requested by the second passenger, executing the function requested by the second passenger.

7. The vehicle control device of claim 1, wherein the operations comprise:

determining that the identity of the first passenger does not match with a stored user of the vehicle;

determining a state of the vehicle; and based on the determination that the identity of the first passenger does not match with a stored user of the vehicle, preventing execution of a function associated with the vehicle in accordance with the state of the vehicle.

8. The vehicle control device of claim 7, wherein the preventing execution of a function comprises:

receiving a start command to start the vehicle; and preventing the vehicle from starting.

9. The vehicle control device of claim 8, wherein the operations comprise:

instructing the communication device to output, through the display, a lock screen configured to receive a password for allowing the vehicle to start.

10. The vehicle control device of claim 9, wherein the instructing the communication device to output a lock screen configured to receive a password comprises:

determining a first seat occupied by the first passenger; and instructing the communication device to output the lock screen only on a first display corresponding to the first seat occupied by the first passenger.

11. The vehicle control device of claim 7, wherein the preventing execution of a function comprises:

determining that the vehicle is running; and based on the determination that the vehicle is running, switching the state of the vehicle to a locked state configured to limit execution of at least one application installed on the vehicle.

12. The vehicle control device of claim 11, wherein the operations comprise:

determining that the vehicle is in the locked state; and based on the determination that the vehicle is in the locked state, instructing the communication device to output an additional message configured to prompt a fourth vocal response from the stored user, the additional message being one of the visual type or the audible type.

13. The vehicle control device of claim 11, wherein the operations comprise:

determining that the vehicle is in the locked state; and
based on the determination that the vehicle is in the locked state, limiting a speed of the vehicle to a reference speed.

14. The vehicle control device of claim 11, wherein the operations comprise:
    determining that the vehicle is in the locked state;
    based on the determination that the vehicle is in the locked state, allowing an autonomous driving of the vehicle to a predetermined destination;
    determining that the vehicle has arrived at the predetermined destination through the autonomous driving; and
    based on the determination that the vehicle has arrived at the predetermined destination through the autonomous driving, powering down the vehicle.

15. The vehicle control device of claim 1, wherein the operations comprise:
    determining that the identity of the first passenger does not match with a stored user of the vehicle; and
    based on the determination that the identity of the first passenger does not match with a stored user of the vehicle,
        switching a state of the vehicle to a locked state configured to limit execution of at least one application installed on the vehicle, and
        instructing the communication device to transmit a notification message to a terminal of the stored user.

16. The vehicle control device of claim 15, wherein the operations comprise:
    receiving, through the communication device, an unlock command from the terminal of the stored user; and
    in response to receiving the unlock command, switching the state of the vehicle to an unlocked state.

17. The vehicle control device of claim 1, wherein the operations comprise:
    determining that the first vocal response from the first passenger has not been received within a predetermined time period from the outputting of the message configured to prompt the first vocal response; and
    based on the determination that the first vocal response from the first passenger has not been received within a predetermined time period, switching a state of the vehicle to a locked state configured to limit execution of at least one application installed on the vehicle.

* * * * *